United States Patent
Matsubara et al.

(10) Patent No.: US 10,286,914 B2
(45) Date of Patent: May 14, 2019

(54) CONTROL APPARATUS FOR VEHICLE AND CONTROL METHOD FOR VEHICLE

(71) Applicant: TOYOTA JIDOSHA KABUSHIKI KAISHA, Toyota-shi, Aichi-ken (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 150 days.

(21) Appl. No.: 15/432,231

(22) Filed: Feb. 14, 2017

(65) Prior Publication Data

US 2017/0240178 A1    Aug. 24, 2017

(30) Foreign Application Priority Data

Feb. 24, 2016  (JP) .................................. 2016-033660

(51) Int. Cl.
| | |
|---|---|
| *B60W 10/02* | (2006.01) |
| *B60W 10/115* | (2012.01) |
| *B60W 30/19* | (2012.01) |
| *F16H 61/14* | (2006.01) |
| *F16H 61/28* | (2006.01) |
| *F16H 61/00* | (2006.01) |

(52) U.S. Cl.
CPC .......... *B60W 30/19* (2013.01); *B60W 10/026* (2013.01); *B60W 10/115* (2013.01); *F16H 61/14* (2013.01); *F16H 61/143* (2013.01); *F16H 61/28* (2013.01); *B60W 2710/024* (2013.01); *B60W 2710/1083* (2013.01); *F16H 2061/0012* (2013.01); *F16H 2061/0015* (2013.01); *F16H 2061/2853* (2013.01)

(58) Field of Classification Search
CPC .... B60W 10/02; B60W 10/026; B60W 10/10; B60W 10/11; B60W 10/115; B60W 2710/024; F16H 61/14; F16H 61/143
See application file for complete search history.

(56) References Cited

U.S. PATENT DOCUMENTS

| | | | |
|---|---|---|---|
| 6,077,188 A | 6/2000 | Futamura et al. | |
| 7,556,586 B2 * | 7/2009 | Nakagawa | F16D 48/02 475/121 |

(Continued)

FOREIGN PATENT DOCUMENTS

| | | |
|---|---|---|
| JP | H04-113058 A | 4/1992 |
| JP | 2010-209942 A | 9/2010 |
| JP | 2013-117242 A | 6/2013 |

*Primary Examiner* — David R Morris
(74) *Attorney, Agent, or Firm* — Oliff PLC

(57) ABSTRACT

An electronic control unit starts shift initial oil pressure control after the completion of lockup initial oil pressure control when shift control is performed during the performance of lockup control, the electronic control unit starts shift initial oil pressure control after the completion of lockup initial oil pressure control. Besides, the electronic control unit places priority on the shift control and starts the lockup initial oil pressure control after the completion of the shift initial oil pressure control, when the lockup control is performed during the performance of the shift control. Therefore, the shift initial oil pressure control and the lockup initial oil pressure control are prevented from occurring at the same time when the shift control and the lockup control are performed at the same time.

10 Claims, 17 Drawing Sheets

(56) References Cited

U.S. PATENT DOCUMENTS

| | | | |
|---|---|---|---|
| 8,682,552 B2* | 3/2014 | Tsutsui | F16H 61/143 |
| | | | 701/54 |
| 2008/0132038 A1 | 6/2008 | Nakagawa et al. | |
| 2011/0246036 A1 | 10/2011 | Tsutsui et al. | |
| 2017/0253249 A1* | 9/2017 | Aratake | B60W 10/026 |

* cited by examiner

FIG. 4

| | ENGAGEMENT OPERATION CHART | | | | | |
|---|---|---|---|---|---|---|
| | C1 | C2 | C3 | C4 | B1 | B2 |
| 1st | ○ | | | | | ○ |
| 2nd | ○ | | | | ○ | |
| 3rd | ○ | | ○ | | | |
| 4th | ○ | | | ○ | | |
| 5th | ○ | ○ | | | | |
| 6th | | ○ | | ○ | | |
| 7th | | ○ | ○ | | | |
| 8th | | ○ | | | ○ | |
| Rev | | | ○ | | | ○ |

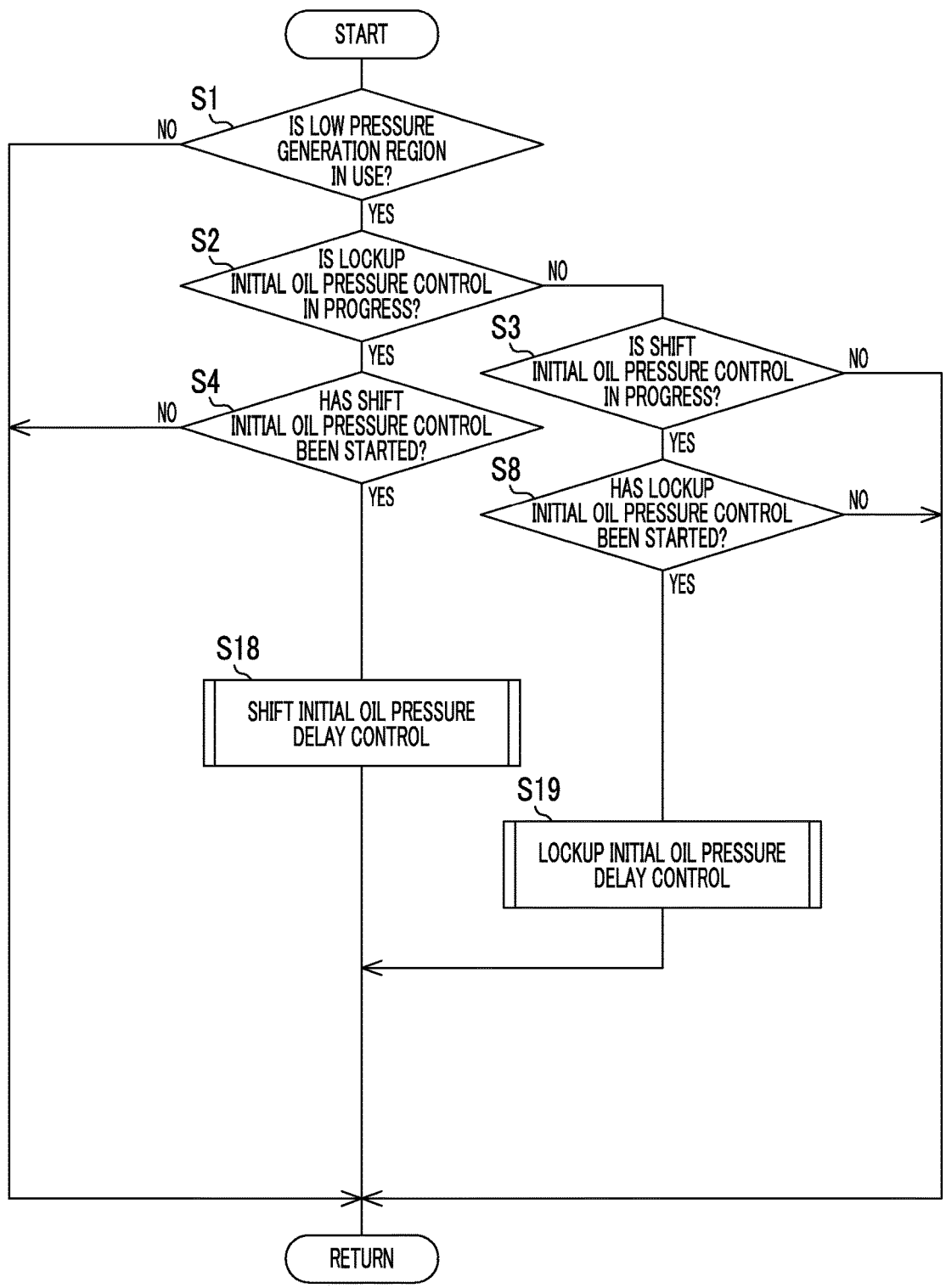

CONTROL APPARATUS FOR VEHICLE AND CONTROL METHOD FOR VEHICLE

INCORPORATION BY REFERENCE

The disclosure of Japanese Patent Application No. 2016-033660 filed on Feb. 24, 2016 including the specification, drawings and abstract is incorporated herein by reference in its entirety.

BACKGROUND

1. Technical Field

The disclosure relates to a control apparatus for a vehicle and a control method for the vehicle that perform lockup control for controlling the engagement pressure of a lockup clutch, and shift control for controlling the engagement pressures of hydraulic engagement devices in shifting a transmission.

2. Description of Related Art

There is known an oil pressure control apparatus that is designed for a vehicular power transmission device equipped with a lockup clutch-equipped fluid-type transmission device and a transmission and that performs lockup control for controlling the engagement pressure of the lockup clutch and shift control for controlling the engagement pressures of hydraulic engagement devices in shifting the transmission. For instance, an oil pressure control apparatus for a vehicular power transmission device that is equipped with a lockup clutch-equipped torque converter and a continuously variable transmission described in Japanese Patent Application Publication No. 2010-209942 (JP 2010-209942 A) is such an example. In the oil pressure control apparatus for the vehicular power transmission device of Japanese Patent Application Publication No. 2010-209942 (JP 2010-209942 A), the lockup clutch is released when an amount of change in accelerator opening degree exceeds a predetermined value during lockup control so that a shift is swiftly started.

SUMMARY

By the way, in the oil pressure control apparatus for the vehicular power transmission device as described above, when shift control and lockup control overlap with each other, lockup control is basically prohibited (the lockup clutch is released) to place priority on shift control. Therefore, in order to further improve fuel economy, there is a need to perform shift control and lockup control at the same time instead of prohibiting lockup control even in the case where shift control and lockup control overlap with each other. However, in the case where shift initial oil pressure control and lockup initial oil pressure control are performed, when shift initial oil pressure control and lockup initial oil pressure control are performed at the same time without taking into account the overlapping of an oil pressure consumption required for shift initial oil pressure control with an oil pressure consumption required for lockup initial oil pressure control, a problem of a decrease in controllability of shift control and lockup control is considered to arise as a result of an insufficient oil pressure.

The disclosure provides a control apparatus for a vehicle and a control method for the vehicle that restrain the oil pressure from becoming insufficient when shift initial oil pressure control and lockup initial oil pressure control are performed in an overlapping manner.

A first aspect of the disclosure is a control apparatus for a vehicle. The vehicle is equipped with a fluid-type transmission device, a transmission and an electronic control unit. The fluid-type transmission device includes a lockup clutch, and the lockup clutch is engaged by an oil pressure. The transmission is configured to selectively constitute one of a plurality of shift stages though engagement and release by a plurality of hydraulic engagement devices. The electronic control unit is configured to perform lockup control for controlling an engagement pressure of the lockup clutch, and the electronic control unit is configured to perform shift control for controlling engagement pressures of the hydraulic engagement devices in shifting the transmission. Furthermore, the electronic control unit is configured to start shift initial oil pressure control after end of lockup initial oil pressure control when the shift control is performed during performance of the lockup control, and the electronic control unit is configured to start the lockup initial oil pressure control after end of the shift initial oil pressure control when the lockup control is performed during performance of the shift control.

According to the foregoing configuration, the electronic control unit starts the shift initial oil pressure control after the end of the lockup initial oil pressure control when the shift control is performed during the performance of the lockup control, and starts the lockup initial oil pressure control after the end of the shift initial oil pressure control when the lockup control is performed during the performance of the shift control. Therefore, even when the shift control and the lockup control are performed at the same time as a whole, the shift initial oil pressure control (quick fill) and the lockup initial oil pressure control (quick fill) are prevented from being performed in an overlapping manner. Therefore, the oil pressure is restrained from becoming insufficient in the case where the shift initial oil pressure control and the lockup initial oil pressure control are performed at the same time.

In the control apparatus, the electronic control unit may be configured to determine whether or not a fuel-efficient running mode in which priority is placed on fuel economy is in use. Furthermore, the electronic control unit may be configured to place priority on the lockup initial oil pressure control and start the shift initial oil pressure control after completion of the lockup initial oil pressure control, when the fuel-efficient running mode is in use.

According to the foregoing configuration, the electronic control unit is configured to place priority on the lockup initial oil pressure control and start the shift initial oil pressure control after the completion of the lockup initial oil pressure control, when the fuel-efficient running mode in which priority is placed on fuel economy is selected. Therefore, the lockup initial oil pressure control is performed in priority to the shift initial oil pressure control. Therefore, fuel economy is favorably improved, and the shift initial oil pressure control and the lockup initial oil pressure control are prevented from overlapping with each other.

In the control apparatus, the electronic control unit may be configured to determine whether or not a driveability running mode in which priority is placed on driveability is in use. Furthermore, the electronic control unit may be configured to place priority on the lockup initial oil pressure control and start the lockup initial oil pressure control after completion of the shift initial oil pressure control, when the driveability running mode is in use.

According to the foregoing configuration, the electronic control unit is configured to place priority on the lockup initial oil pressure control and start the lockup initial oil pressure control after the completion of the shift initial oil pressure control, when the driveability running mode in which priority is placed on driveability is selected. Therefore, the shift initial oil pressure control is performed in priority to the lockup initial oil pressure control. Therefore, driveability is favorably improved, and the shift initial oil pressure control and the lockup initial oil pressure control are prevented from overlapping with each other.

In the control apparatus, the electronic control unit may be configured to place priority on the lockup initial oil pressure control and start second shift control after completion of first shift control, when the driveability running mode in which priority is placed on driveability is selected and the second shift control is performed during the first shift control. Incidentally, the first shift control is defined as control for selecting one of the plurality of the shift stages in the shift control, and the second shift control is defined as control for selecting that one of the plurality of the shift stages which is different from the shift stage selected in the first shift control in the shift control.

According to the foregoing configuration, the electronic control unit is configured to place priority on the lockup initial oil pressure control and start the second shift control after the completion of the first shift control, when the driveability running mode in which priority is placed on driveability is selected and the second shift control is performed during the first shift control. Therefore, shift initial oil pressure control in the first shift control and shift initial oil pressure control in the second shift control are prevented from overlapping with each other. Therefore, the oil pressure is favorably restrained from becoming insufficient in a multiple shift in which the second shift control is performed during the first shift control. Besides, in the multiple shift, priority is placed on the first shift control and the second shift control is started after the completion of the first shift control,
by the electronic control unit. Therefore, driveability is favorably improved.

In the control apparatus, the electronic control unit may be configured to place priority on second shift control and end first shift control in mid-course, when the fuel-efficient running mode in which priority is placed on fuel economy is selected and the second shift control is performed during the first shift control. Incidentally, the first shift control is defined as control for selecting one of the plurality of the shift stages in the shift control, and the second shift control is defined as control for selecting that one of the plurality of the shift stages which is different from the shift stage selected in the first shift control in the shift control.

According to the foregoing configuration, the electronic control unit places priority on the second shift control and ends the first shift control in mid-course, when the fuel-efficient running mode in which priority is placed on fuel economy is selected and the second shift control is performed during the first shift control. Therefore, shift initial oil pressure control in the first shift control and shift initial oil pressure control in the second shift control are prevented from overlapping with each other. Therefore, the oil pressure is favorably restrained from becoming insufficient in a multiple shift in which the second shift control is performed during the first shift control. Besides, in the multiple shift, priority is placed on the second shift control and the first shift control is ended in mid-course, by the electronic control unit. Therefore, fuel economy is favorably improved.

In the control apparatus, the lockup control is defined as control for making an engagement pressure of the lockup clutch equal to a first predetermined engagement pressure such that the lockup clutch is engaged. Besides, the lockup initial oil pressure control is defined as control for temporarily increasing the engagement pressure of the lockup clutch above the first predetermined engagement pressure in starting the lockup control. Then, the shift control is defined as control for making engagement pressures of the hydraulic engagement devices equal to a second predetermined engagement pressure such that at least one of the hydraulic engagement devices is engaged in shifting the transmission. The shift initial oil pressure control is defined as control for temporarily increasing the engagement pressures of the hydraulic engagement devices above the second predetermined engagement pressure in starting the shift control.

According to the foregoing configuration, the electronic control unit starts the shift initial oil pressure control after the end of the lockup initial oil pressure control when the shift control is performed during the performance of the lockup control, and starts the lockup initial oil pressure control after the end of the shift initial oil pressure control when the lockup control is performed during the performance of the shift control. Therefore, even when the shift control and the lockup control are performed at the same time as a whole, the shift initial oil pressure control (quick fill) and the lockup initial oil pressure control (quick fill) are prevented from being performed in an overlapping manner. Therefore, the oil pressure is restrained from becoming insufficient in the case where the shift initial oil pressure control and the lockup initial oil pressure control are performed at the same time.

A second aspect of the disclosure is a control method for a vehicle. The vehicle is equipped with a fluid-type transmission device, a transmission and an electronic control unit. The fluid-type transmission device includes a lockup clutch that is engaged by an oil pressure. The transmission selectively constitutes one of a plurality of shift stages through engagement and release by a plurality of hydraulic engagement devices. The electronic control unit performs lockup control for controlling an engagement pressure of the lockup clutch, and performs shift control for controlling engagement pressures of the hydraulic engagement devices in shifting the transmission. Furthermore, the electronic control unit starts shift initial oil pressure control after end of lockup initial oil pressure control when the shift control is performed during performance of the lockup control, and starts the lockup initial oil pressure control after end of the shift initial oil pressure control when the lockup control is performed during performance of the shift control.

According to the foregoing configuration, the electronic control unit starts the shift initial oil pressure control after the end of the lockup initial oil pressure control when the shift control is performed during the performance of the lockup control, and starts the lockup initial oil pressure control after the end of the shift initial oil pressure control when the lockup control is performed during the performance of the shift control. Therefore, even when the shift control and the lockup control are performed at the same time as a whole, the shift initial oil pressure control (quick fill) and the lockup initial oil pressure control (quick fill) are prevented from being performed in an overlapping manner. Therefore, the oil pressure is restrained from becoming insufficient in the case where the shift initial oil pressure control and the lockup initial oil pressure control are performed at the same time.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 4 is an engagement operation chart illustrating a relationship between the shift operation of the automatic transmission of FIG. 2 and the combination of operations of hydraulic frictional engagement devices employed for the shift operation;

FIG. 17 is a flowchart illustrating an exemplary control operation of lockup initial oil pressure control and shift initial oil pressure control at the time when shift control is performed during the performance of lockup control or when lockup control is performed during the performance of shift control, in the electronic control unit of FIG. 16.

DETAILED DESCRIPTION OF EMBODIMENTS

The embodiments of the disclosure will be described hereinafter in detail with reference to the drawings. Incidentally, in the following embodiments of the disclosure, the drawings are simplified or modified as appropriate, and the dimensional ratios, shapes and the like of respective components are not necessarily depicted with accuracy.

Figure 1:
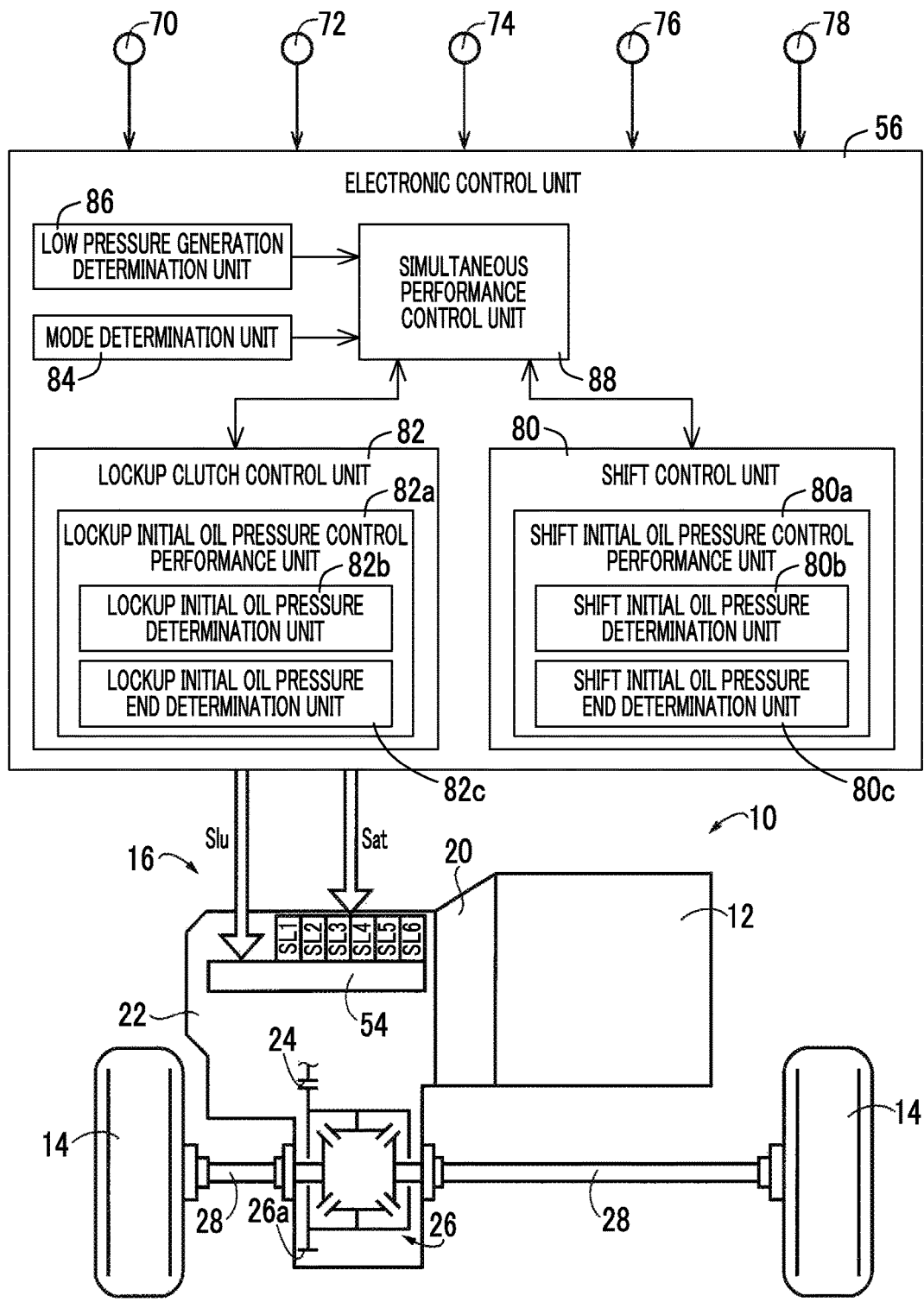
FIG. 1 is a view illustrating the general configuration of a vehicle to which the disclosure is applied, and is a view illustrating an essential part of a control system and control functions for various kinds of control in the vehicle.

FIG. 1 is a view illustrating the general configuration of a vehicle 10 to which the disclosure is applied, and is a view illustrating an essential part of a control system for various kinds of control in the vehicle 10. In FIG. 1, the vehicle 10 is equipped with an engine 12, driving wheels 14, and a vehicular power transmission device 16 (hereinafter referred to as the power transmission device 16) that is provided in a power transmission path between the engine 12 and the driving wheels 14. The power transmission device 16 is equipped with a torque converter (a fluid-type transmission device) 20, an automatic transmission (a transmission) 22, a differential gear device (a differential gear) 26, a pair of axles 28 and the like. The torque converter 20 and the automatic transmission 22 are disposed in a case 18 (see FIG. 2) as a non-rotary member that is attached to a vehicle body. The differential gear device 26 is configured such that a transmission output gear 24 as an output rotary member of the automatic transmission 22 is coupled to a ring gear 26a. The pair of the axles 28 are coupled to the differential gear device 26. In the power transmission device 16, a power that is output from the engine 12 is transmitted to the driving wheels 14 sequentially via the torque converter 20, the automatic transmission 22, the differential gear device 26, the axles 28 and the like.

The engine 12 is a driving force source of the vehicle 10, and is an internal combustion engine, for example, a gasoline engine, a diesel engine or the like.

Figure 2:
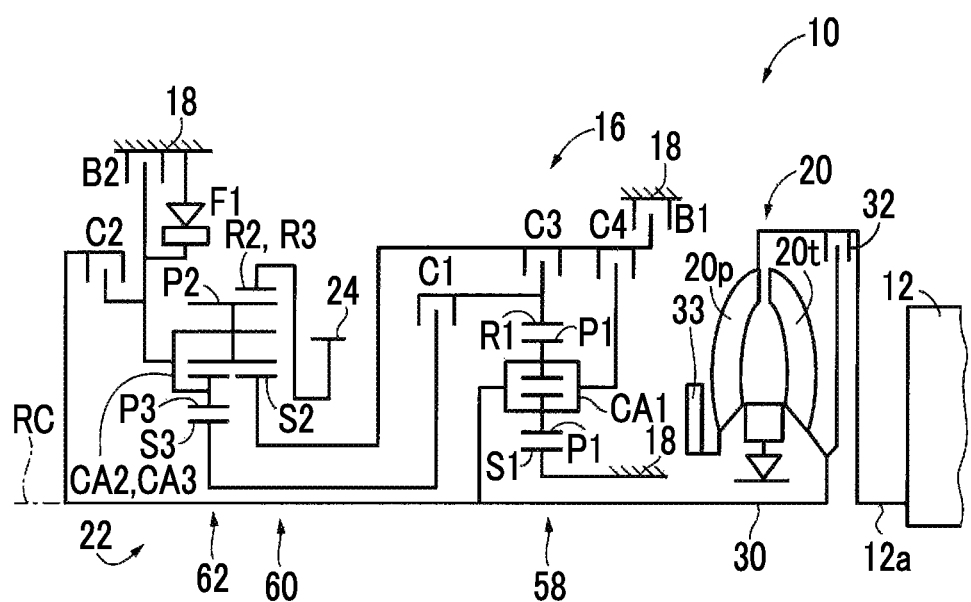
FIG. 2 is a skeleton diagram illustrating an exemplary torque converter and an exemplary automatic transmission that are provided in the vehicle of FIG. 1.

FIG. 2 is a skeleton diagram illustrating an example of the torque converter 20 and an example of the automatic transmission 22. The torque converter 20, the automatic transmission 22 and the like are substantially symmetrically configured with respect to an axial center RC of a transmission input shaft 30 as an input rotary member of the automatic transmission 22. Incidentally, a lower half below the axial center RC is omitted in FIG. 2.

Figure 3:
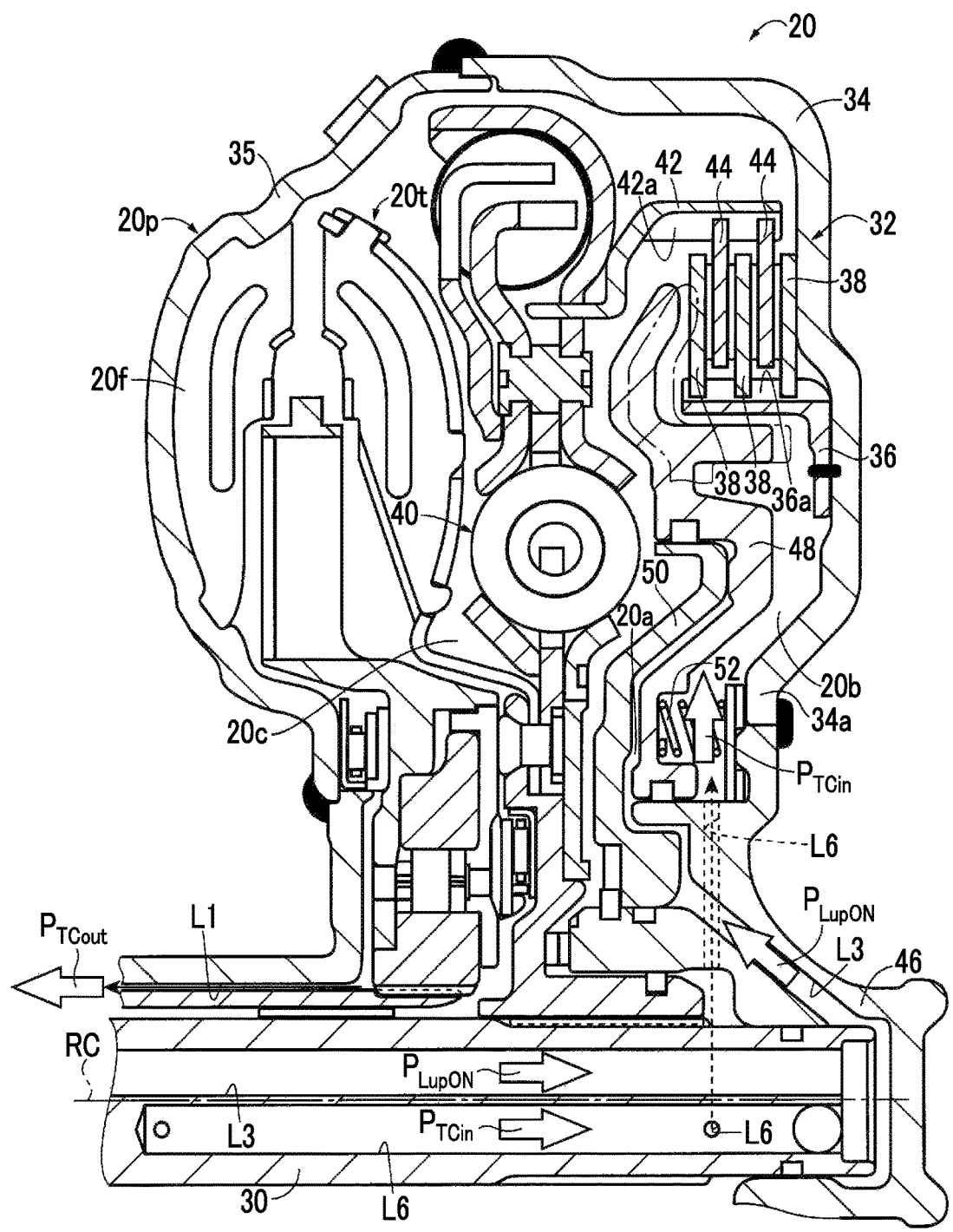
FIG. 3 is a cross-sectional view of the torque converter of FIG. 2.

As shown in FIGS. 2 and 3, the torque converter 20 is equipped with a front cover 34, a rear cover 35, a plurality of pump blades 20f, a pump impeller 20p and a turbine impeller 20t. The front cover 34 and the rear cover 35 are welded to each other. The plurality of the pump blades 20f are fixed to an inner side of the rear cover 35. The pump impeller 20p is coupled to a crankshaft 12a of the engine 12 in such a manner as to enable power transmission, and is disposed in such a manner as to rotate around the axial center RC. The turbine impeller 20t is opposed to the rear cover 35, and is coupled to the transmission input shaft 30 in such a manner as to enable power transmission. Furthermore, the torque converter 20 is equipped with a lockup clutch 32 that can directly couple the pump impeller 20p and the turbine impeller 20t (i.e., input/output rotary members of the torque converter 20) to each other. As described hitherto, the torque converter 20 functions as a fluid-type transmission device equipped with the lockup clutch 32, which is provided in a power transmission path between the engine 12 and the automatic transmission 22. Besides, the power transmission device 16 is equipped with a mechanical oil pump 33 that is coupled to the pump impeller 20p in such a manner as to enable power transmission. By being rotationally driven by the engine 12, the oil pump 33 generates (discharges) a working fluid pressure for performing shift control of the automatic transmission 22, engaging the lockup clutch 32 and supplying lubricating oil to respective portions of the power transmission path of the power transmission device 16.

The lockup clutch 32 is a multiplate clutch. As shown in FIG. 3, the lockup clutch 32 is equipped with a first annular member 36, a plurality of (three in the present embodiment of the disclosure) first annular friction plates 38, a second annular member 42, a plurality of (two in the present embodiment of the disclosure) second annular friction plates 44, an annular pressing member 48, an annular fixed member 50 and a return spring 52. The first annular member 36 is fixed to the front cover 34, which is integrally coupled to the pump impeller 20p, through welding. The plurality of the first annular friction plates 38 are engaged with outer peripheral spline teeth 36a that are formed on an outer periphery of the first annular member 36, relatively unrotatably around the axial center RC and movably in the direction of the axial center RC. The second annular member 42 is coupled to the transmission input shaft 30 and the turbine impeller 20t in such a manner as to enable power transmission, via a damper device 40 that is provided in the torque converter 20. The plurality of the second annular friction plates 44 are engaged with inner peripheral spline teeth 42a that are formed on an inner periphery of the second annular member 42, relatively unrotatably around the axial center RC and movably in the direction of the axial center RC. Furthermore, the plurality of the second annular friction plates 44 are disposed among the plurality of the first friction plates 38 respectively. The annular pressing member 48 is supported movably in the direction of the axial center RC by a hub member 46, and is opposed to the front cover 34. The hub member 46 is fixed to an inner periphery portion 34a of the front cover 34, and is supported in such a manner as to be able to rotate an end portion of the transmission input shaft 30 on the front cover 34 side around the axial center RC. The annular fixed member 50 is supported by the hub member 46 at a fixed position, and is disposed opposite the pressing member 48 on the other side of the front cover 34 side of the pressing member 48. The return spring 52 urges the pressing member 48 toward the fixed member 50.

Furthermore, as shown in FIG. 3, an engagement-side oil chamber 20a, a release-side oil chamber 20b and a supply oil chamber 20c are formed in the torque converter 20. The engagement-side oil chamber 20a is formed between the pressing member 48 and the fixed member 50 to engage the lockup clutch 32. The release-side oil chamber 20b is formed between the pressing member 48 and the front cover 34 to release the lockup clutch 32. The supply oil chamber 20c is formed by a region that is in the rear cover 35 and the front cover 34 to which a working fluid pressure from the release-side oil chamber 20b is supplied and that excludes the engagement-side oil chamber 20a and the release-side oil chamber 20b. In the torque converter 20, for example, when the working fluid pressure in the engagement-side oil chamber 20a, namely, a lockup-on pressure $P_{LupON}$ (kPa) is relatively high and the pressing member 48 is moved toward the front cover 34 as indicated by an alternate long and short dash line, the first friction plates 38 clamp the second friction plates 44 respectively through the pressing member 48. Then, the pump impeller 20p that is coupled to the first annular member 36, and the turbine impeller 20t that is coupled to the second annular member 42 rotate integrally with each other. When the lockup-on pressure $P_{LupON}$ (kPa) is relatively high, the working fluid pressure in the release-side oil chamber 20b, namely, a torque converter-in pressure $P_{TCin}$ (kPa) is relatively low. Besides, for example, when the lockup-on pressure $P_{LupON}$ (kPa) in the engagement-side oil chamber 20a is relatively low and the pressing member 48 is moved to a position spaced apart from the first friction plates 38 as indicated by a solid line, the pump impeller 20p that is coupled to the first annular member 36, and the turbine impeller 20t that is coupled to the second annular member 42 rotate relatively to each other. When the lockup-on pressure $P_{LupON}$ (kPa) is relatively low, the torque converter-in pressure $P_{TCin}$ (kPa) in the release-side oil chamber 20b is relatively high.

The lockup clutch 32 is a hydraulic multiplate friction clutch in which the plurality of the first friction plates 38 and the plurality of the second friction plates 44 are frictionally engaged through the control of a lockup differential pressure $\Delta P$ (=$P_{LupON}$−($P_{TCin}$+$P_{TCout}$)/2) by an oil pressure control circuit 54 that will be described later. The lockup differential pressure $\Delta P$ is a differential pressure between the lockup-on pressure $P_{LupON}$ (kPa) in the engagement-side oil chamber 20a and an average (($P_{TCin}$+$P_{TCout}$)/2) of the torque converter-in pressure $P_{TCin}$ (kPa) in the release-side oil chamber 20b and a torque converter-out pressure $P_{TCout}$ (kPa) discharged from the supply oil chamber 20c. Incidentally, the aforementioned expression of the lockup differential pressure (the engagement pressure) $\Delta P$=$P_{LupON}$−($P_{TCin}$+$P_{TCout}$)/2 is an experimental expression determined in advance through an experiment or the like. Besides, in the aforementioned expression, the torque converter-in pressure $P_{TCin}$ and the torque converter-out pressure $P_{TCout}$ change depending on an engine rotational speed, a turbine rotational speed, a differential rotational speed therebetween (the engine rotational speed−the turbine rotational speed), a line pressure, an ATF oil temperature, an engine torque and the like. Accordingly, in the lockup clutch 32, the plurality of the first friction plates 38 and the plurality of the second friction plates 44 are frictionally engaged with one another through the attainment of a predetermined value by the lockup differential pressure (the engagement pressure).

In the lockup clutch 32, the lockup differential pressure $\Delta P$ is controlled via the oil pressure control circuit 54 by an electronic control unit (an oil pressure control device) 56. For example, the electronic control unit 56 makes a changeover to one of the following operation states, that is, a lockup release state (lockup off), a lockup slip state (a slip state) and a lockup state (lockup on). The lockup release state is a state where the lockup differential pressure $\Delta P$ is negative and the lockup clutch 32 is released. The lockup slip state is a state where the lockup differential pressure $\Delta P$ is equal to or higher than zero and the lockup clutch 32 is half-engaged while slipping. The lockup state is a state where the lockup differential pressure $\Delta P$ is maximized and the lockup clutch 32 is completely engaged. Incidentally, the torque converter 20 obtains a torque amplification effect through changeover of the operation state of the lockup clutch 32 to a lockup-off state. Besides, the pump impeller 20p and the turbine impeller 20t are rotated integrally with each other, and the power of the engine 12 is directly transmitted to the automatic transmission 22 side, through changeover of the operation state of the lockup clutch 32 to a lockup-on state. Besides, when the vehicle 10 is driven (power is on), the engine rotational speed is restrained from blowing up, and a noise such as booming noise or the like is suppressed, through changeover of the operation state of the lockup clutch 32 to the slip state and the control of a slip amount (=the engine rotational speed−the turbine rotational speed) to a target slip amount. On the other hand, when the vehicle 10 is not driven (power is off), the crankshaft 12a of the engine 12 is rotated in such a manner as to follow the transmission input shaft 30 with the target slip amount, and for example, a fuel-cut region is enlarged.

The automatic transmission 22 constitutes part of a power transmission path from the engine 12 to the driving wheels 14. Then, the automatic transmission 22 forms a plurality of gear stages (shift stages) with different gear ratios (speed ratios) through selective engagement of one or some of a plurality of hydraulic frictional engagement devices (first to fourth clutches C1 to C4, a first brake B1 and a second brake B2) and a one-way clutch F1. Therefore, the automatic transmission 22 is a planetary gear-type multistage transmission that functions as a stepped automatic transmission. For example, the automatic transmission 22 is a stepped transmission that is often employed in a known vehicle to make a so-called clutch-to-clutch shift. The automatic transmission 22 has a double pinion-type first planetary gear device 58, a single pinion-type second planetary gear device 60 that is configured as a Ravigneaux type, and a double pinion-type third planetary gear device 62 that is configured as a Ravigneaux type, concentrically with one another (on the axial center RC). The automatic transmission 22 shifts rotation of the transmission input shaft 30 and outputs the shifted rotation from the transmission output gear 24.

The first planetary gear device 58 has a first sun gear S1 as an external gear, a first ring gear R1 as an internal gear that is arranged concentrically with the first sun gear S1, a first pinion gear P1 that is constituted of a pair of gear pairs that mesh with the first sun gear S1 and the first ring gear R1, and a first carrier CA1 that supports the first pinion gear P1 such that the first pinion gear P1 can rotate around its own axis and around the first carrier CA1.

The second planetary gear device 60 has a second sun gear S2 as an external gear, a second ring gear R2 as an internal gear that is arranged concentrically with the second sun gear S2, a second pinion gear P2 that meshes with the second sun gear S2 and the second ring gear R2, and a second carrier CA2 that supports the second pinion gear P2 such that the second pinion gear P2 can rotate around its own axis and around the second carrier CA2.

The third planetary gear device 62 has a third sun gear S3 as an external gear, a third ring gear R3 as an internal gear that is arranged concentrically with the third sun gear S3, a third pinion gear P3 that is constituted of a pair of gear pairs that mesh with the third sun gear S3 and the third ring gear R3, and a third carrier CA3 that supports the third pinion gear P3 such that the third pinion gear P3 can rotate around its own axis and around the third carrier CA3.

The aforementioned first clutch C1, the aforementioned second clutch C2, the aforementioned third clutch C3, the aforementioned fourth clutch C4, the aforementioned first brake B1 and the aforementioned second brake B2 (hereinafter referred to simply as the hydraulic frictional engagement devices when these clutches and brakes are not distinguished from one another in particular) are constituted of wet-type multiplate clutches and a brake that are pressed by hydraulic actuators, a band brake that is tightened by a hydraulic actuator, and the like. Incidentally, each of the hydraulic frictional engagement devices is engaged through the attainment of a predetermined value by the value of an engagement pressure.

As shown in an engagement operation chart of FIG. 4, eight forward stages and one backward stage are formed in accordance with the operation of an accelerator by a driver, a vehicle speed V and the like, through the control of engagement and release of the plurality of the hydraulic frictional engagement devices. In FIG. 4, "1st" to "8th" mean first to eighth shift stages as forward gear stages, and "Rev" means a backward shift stage as a backward gear stage. A gear ratio γ of the automatic transmission 22 corresponding to each of the shift stages (=a transmission input shaft rotational speed Nin/a transmission output gear rotational speed Nout) is appropriately determined by respective gear ratios (the number of teeth of the sun gear/the number of teeth of the ring gear) of the first planetary gear device 58, the second planetary gear device 60 and the third planetary gear device 62.

Figure 5:
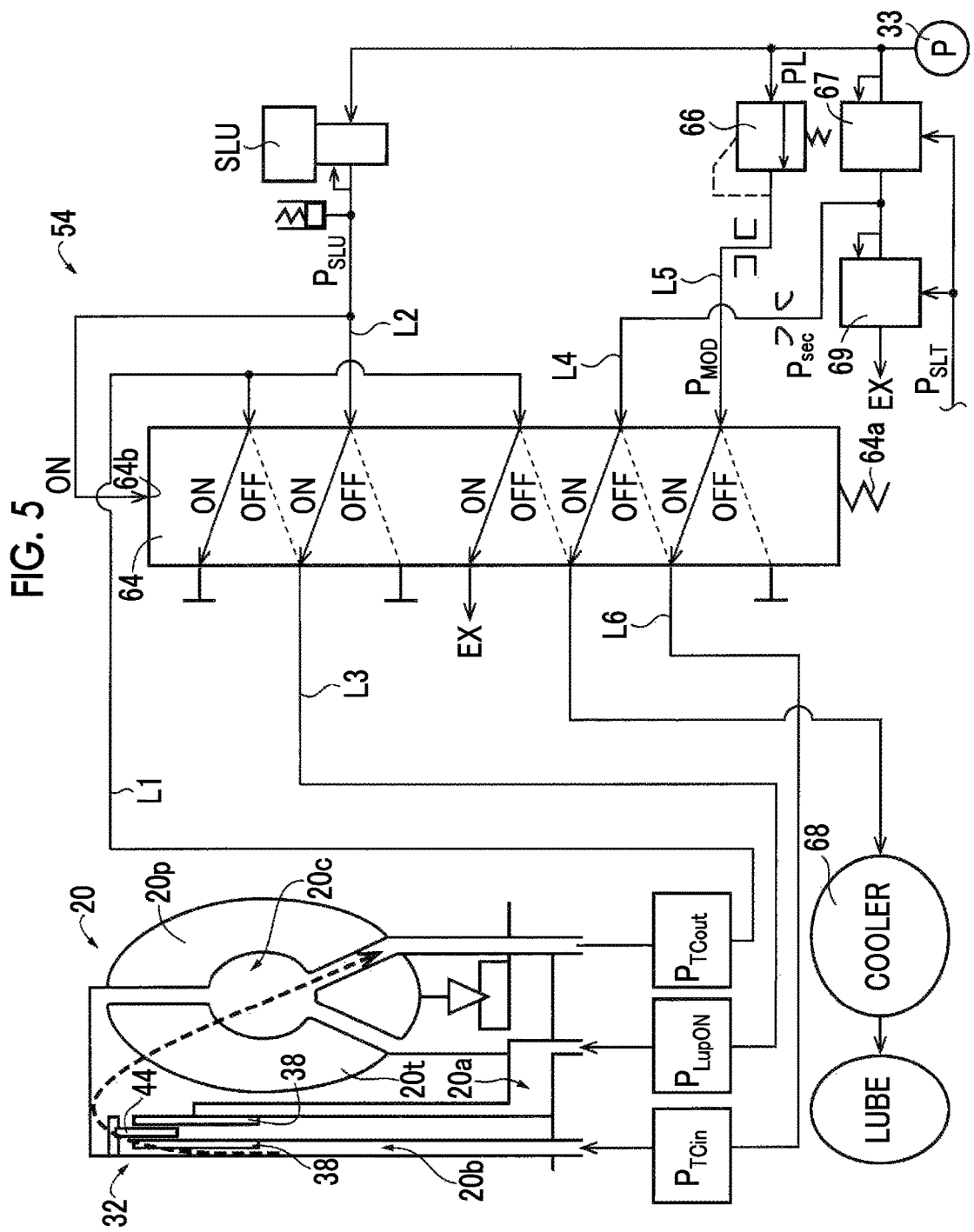
FIG. 5 is a circuit diagram showing an exemplary essential part of an oil pressure control circuit regarding a linear solenoid valve and the like that control the operation of a lockup clutch that is provided in the torque converter of FIG. 2.

As shown in FIG. 5, an oil pressure control circuit 54 is equipped with a lockup control valve 64, a linear solenoid valve SLU that adjusts a first line oil pressure PL, which is adjusted by a relief-type first line pressure adjusting valve 67, to a lockup engagement pressure $P_{SLU}$ using an oil pressure generated by the oil pump 33 as a source pressure, and a modulator valve 66 that adjusts a modulator oil pressure $P_{MOD}$ to a constant value using the first line oil pressure PL as a source pressure. Incidentally, the oil pressure control circuit 54 is equipped with linear solenoid valves SL1 to SL6 (see FIG. 1) that control the operation of the respective hydraulic actuators (not shown) of the hydraulic frictional engagement devices. Incidentally, in FIG. 5, the first line oil pressure PL is used as the source pressure of the aforementioned liner solenoid valve SLU, but the modulator oil pressure $P_{MOD}$ may be used instead of the first line oil pressure PL.

Besides, as shown in FIG. 5, the lockup control valve 64 is a two-position changeover valve that is designed to be changed over from an OFF position to an ON position when the lockup engagement pressure $P_{SLU}$ exceeds a predetermined value. At the ON position, the lockup control valve 64 closes a first oil passage L1, connects a second oil passage L2 to a third oil passage L3, connects the first oil passage L1 to a discharge oil passage EX, connects a fourth oil passage L4 to a cooler 68, and connects a fifth oil passage L5 to a sixth oil passage L6. The aforementioned first oil passage L1 is an oil passage into which the torque converter-out pressure $P_{TCout}$ discharged from the supply oil chamber 20c of the torque converter 20 is introduced. The aforementioned second oil passage L2 is an oil passage into which the lockup engagement pressure $P_{SLU}$ adjusted by the linear solenoid valve SLU is introduced. The aforementioned third oil passage L3 is an oil passage into which the lockup-on pressure $P_{LupON}$ that is supplied to the engagement-side oil chamber 20a of the torque converter 20 is introduced. The aforementioned fourth oil passage L4 is an oil passage into which a second line oil pressure Psec that is adjusted by a second line pressure adjusting valve 69 using an oil pressure relieved from the first line pressure adjusting valve 67 as a source pressure is introduced. The aforementioned fifth oil passage L5 is an oil passage into which the modulator oil pressure $P_{MOD}$ adjusted to a constant value by the modulator valve 66 is introduced. The aforementioned sixth oil passage L6 is an oil passage into which the torque converter-in pressure $P_{TCin}$ that is supplied to the release-side oil chamber 20b of the torque converter 20 is introduced.

Besides, as shown in FIG. 5, at the OFF position, the lockup control valve 64 connects the first oil passage L1 to the third oil passage L3, closes the second oil passage L2, connects the first oil passage L1 to the cooler 68, connects the fourth oil passage L4 to the sixth oil passage L6, and closes the fifth oil passage L5. The aforementioned lockup control valve 64 is equipped with a spring 64a that urges a spool valve piece toward the OFF position, and an oil chamber 64b that receives the lockup engagement pressure $P_{SLU}$ to urge the spool valve piece toward the ON position. In the lockup control valve 64, when the lockup engagement pressure $P_{SLU}$ is lower than a predetermined value, the spool valve piece is held at the OFF position due to an urging force of the spring 64a. Besides, in the lockup control valve 64, when the lockup engagement pressure $P_{SLU}$ is higher than the predetermined value, the spool valve piece is held at the ON position against an urging force of the spring 64a. Incidentally, in the lockup control valve 64 of FIG. 5, solid lines indicate a flow passage at the time when the spool valve piece is at the ON position, and broken lines indicate a flow passage at the time when the spool valve piece is at the OFF position.

The operation state of the lockup clutch 32 is changed over through changeover of a working fluid pressure, which is supplied from the lockup control valve 64 to the engagement-side oil chamber 20a and the release-side oil chamber 20b in the torque converter 20, by the oil pressure control circuit 54 configured as described above. First of all, a case where the lockup clutch 32 is in the slip state or the lockup-on state will be described. In the lockup control valve 64, when the lockup engagement pressure $P_{SLU}$ made higher than a predetermined value by a command signal that is output from the electronic control unit 56 is supplied, the lockup control valve 64 is changed over to the ON position. Then, the lockup engagement pressure $P_{SLU}$ is supplied to the engagement-side oil chamber 20a of the torque converter 20, and the modulator oil pressure $P_{MOD}$ supplied to the lockup control valve 64 is supplied to the release-side oil chamber 20b of the torque converter 20. That is, the lockup engagement pressure $P_{SLU}$ is supplied to the engagement-side oil chamber 20a as the lockup-on pressure $P_{LupON}$, and the modulator oil pressure $P_{MOD}$ is supplied to the release-side oil chamber 20b as the torque converter-in pressure $P_{TCin}$. Incidentally, when the lockup control valve 64 is changed over to the ON position, there is established a relationship in magnitude among the lockup-on pressure $P_{LupON}$, the torque converter-in pressure $P_{TCin}$ and the torque converter-out pressure $P_{TCout}$ as follows: the lockup-on pressure $P_{LupON}$>the torque converter-in pressure $P_{TCin}$>the torque converter-out pressure $P_{TCout}$. Thus, the lockup-on pressure (the engagement pressure) $P_{LupON}$ in the engagement-side oil chamber 20a of the torque converter 20 is adjusted by the linear solenoid valve SLU. Then, the lockup differential pressure $\Delta P$ $(=P_{LupON}-(P_{TCin}+P_{TCout})/2)$ is adjusted, and the operation state of the lockup clutch 32 is changed over in a range from the slip state to the lockup-on state.

Next, a case where the lockup clutch 32 is in the lockup-off state will be described. In the lockup control valve 64, when the lockup engagement pressure $P_{SLU}$ is lower than the predetermined value, the lockup control valve 64 is changed over to the OFF position due to an urging force of the spring 64a. Then, the torque converter-out pressure $P_{TCout}$ discharged from the supply oil chamber 20c of the torque converter 20 is supplied to the engagement-side oil chamber 20a of the torque converter 20, and the second line oil pressure Psec is supplied to the release-side oil chamber 20b of the torque converter 20. That is, the torque converter-out pressure $P_{TCout}$ is supplied to the engagement-side oil chamber 20a as the lockup-on pressure $P_{LupON}$, and the second line oil pressure Psec is supplied to the release-side oil chamber 20b as the torque converter-in pressure $P_{TCin}$. Incidentally, when the lockup control valve 64 is changed over to the OFF position, there is established a relationship in magnitude among the aforementioned lockup-on pressure $P_{LupON}$, the torque converter-in pressure $P_{TCin}$ and the torque converter-out pressure $P_{TCout}$ as follows: the torque converter-in pressure $P_{TCin}$>the torque converter-out pressure $P_{TCout}$>the lockup-on pressure $P_{LupON}$. Thus, the operation state of the lockup clutch 32 is changed over to the lockup-off state.

Returning to FIG. 1, the vehicle 10 is equipped with the electronic control unit 56 that performs, for example, lockup control for controlling the lockup differential pressure $\Delta P$ of the lockup clutch 32, shift control for controlling the engagement pressures of the hydraulic frictional engagement devices in shifting the automatic transmission 22, and the like via the oil pressure control circuit 54. FIG. 1 is a view showing an input/output system of the electronic control unit 56, and is a functional block diagram illustrating an essential part of control functions performed by the electronic control unit 56. The electronic control unit 56 is configured to include, for example, a so-called microcomputer that is equipped with a CPU, a RAM, a ROM, an input/output interface and the like. Moreover, the CPU performs various kinds of control of the vehicle 10 by carrying out a signal processing in accordance with a program stored in advance in the ROM while utilizing a temporary storage function of the RAM.

Various input signals that are detected by various sensors with which the vehicle 10 is equipped are supplied to the electronic control unit 56. For example, a signal indicating a throttle valve opening degree θth (%) that is detected by a throttle valve opening degree sensor 70, a signal indicating the vehicle speed V (km/h) that is detected by a vehicle speed sensor 72, an ON/OFF signal that is detected by a fuel-efficient running mode selection switch 74 to indicate whether or not the fuel-efficient running mode selection switch 74 has been operated, an ON/OFF signal that is detected by a driveability running mode selection switch 76 to indicate whether or not the driveability running mode selection switch 76 has been operated, a signal indicating a rotational speed Np (rpm) of an oil pump 33 that is detected by an oil pump rotation sensor 78, and the like are input to the electronic control unit 56. Besides, an oil pressure control command signal Sat for oil pressure control regarding the shifting of the automatic transmission 22, an oil pressure control command signal Slu for changeover control of the operation state of the lockup clutch 32, and the like are output from the electronic control unit 56. Incidentally, the aforementioned oil pressure control command signal Sat is a command signal (a shift command pressure) for driving the linear solenoid valves SL1 to SL6 that adjust the oil pressures supplied to the hydraulic actuators (not shown) of the hydraulic frictional engagement devices respectively. Then, the aforementioned oil pressure control command signal Sat is output to the linear solenoid valves SL1 to SL6 of the oil pressure control circuit 54. Besides, the aforementioned oil pressure control command signal Slu is a command signal (a lockup command pressure) for driving the linear solenoid valve SLU that adjusts the lockup engagement pressure $P_{SLU}$. The aforementioned oil pressure control command signal Slu is output to the linear solenoid valve SLU of the oil pressure control circuit 54.

A shift control unit 80 shown in FIG. 1 makes a determination on a shift by applying the actual vehicle speed V and the actual throttle valve opening degree θth to a relationship (a shift map or a shift diagram) that is determined in advance using the vehicle speed V and the throttle valve opening degree θth as variables. For example, the shift control unit 80 outputs the oil pressure control command signal Sat to the oil pressure control circuit 54 as a shift command to engage and/or release the hydraulic frictional engagement device(s) regarding a shift of the automatic transmission 22 such that the determined predetermined forward gear stage is obtained according to the engagement operation chart shown in FIG. 4. The linear solenoid valves SL1 to SL6 that are provided in the oil pressure control circuit 54 are driven (operated) such that the shift of the automatic transmission 22 is carried out in accordance with this oil pressure control command signal Sat. Then, the hydraulic actuator(s) of the hydraulic frictional engagement device(s) regarding the shift is/are operated.

When shift control is performed by the shift control unit 80, for example, when shift control from the second shift stage "2nd" to the third shift stage "3rd" is performed by the shift control unit 80, a shift initial oil pressure control performance unit 80a that is provided in the shift control unit 80 performs shift initial oil pressure control (quick fill) for quickly supplying working fluid to the hydraulic actuator of the third clutch C3 by temporarily raising the shift command pressure of the linear solenoid valve SL3 to swiftly narrow down a pack clearance of the third clutch C3, which is the engagement-side hydraulic frictional engagement device in which the predetermined gear stage determined as a shift destination, namely, the third shift stage "3rd" is formed. Incidentally, the aforementioned pack clearance is, for example, a clearance that is created until a piston (not shown) that is provided in the third clutch C3 comes into abutment on a frictional engagement member to start frictional engagement from a release state where the piston is returned by a return spring.

A shift initial oil pressure determination unit 80b determines whether or not shift initial oil pressure control has been performed or started by the shift initial oil pressure control performance unit 80a. For example, when the engagement command pressure that is output to the linear solenoid valve SL3 that supplies working fluid to the hydraulic actuator of the third clutch C3 is temporarily raised in a shift from the second shift stage to the third shift stage, the shift initial oil pressure determination unit 80b determines that shift initial oil pressure control has been performed (started).

When the shift initial oil pressure determination unit 80b determines that shift initial oil pressure control has been started, a shift initial oil pressure end determination unit 80c determines whether or not shift initial oil pressure control has been ended. For example, the shift initial oil pressure end determination unit 80c determines that shift initial oil pressure control has been ended, for example, when the engagement command pressure that is output to the linear solenoid valve SL3 is lowered by a predetermined value from a temporarily raised state.

A lockup clutch control unit 82 performs lockup control for controlling the lockup differential pressure $\Delta P$ ($=P_{LupON}-(P_{TCin}+P_{Tcout})/2$). For example, the lockup clutch control unit 82 uses a relationship determined in advance (a lockup region diagram) and having a lockup-off region, a slip operation region and a lockup-on region, using the vehicle speed V and the throttle valve opening degree θth as variables. Then, the lockup clutch control unit 82 determines, based on the actual vehicle speed V and the actual throttle valve opening degree θth, which one of the lockup-off region, the slip operation region and the lockup-on region is in use. Besides, the lockup clutch control unit 82 outputs the oil pressure control command signal Slu to the oil pressure control circuit 54 such that the operation state of the lockup clutch 32 coincides with an operation state corresponding to the determined region. The linear solenoid valve SLU that is provided in the oil pressure control circuit 54 is driven (operated) such that the operation state of the lockup clutch 32 coincides with the operation state corresponding to the determined region, in accordance with this oil pressure control command signal Slu.

When lockup clutch control is started upon a changeover from the lockup-off region to the slip operation region or the lockup-on region by the lockup clutch control unit 82, a lockup initial oil pressure control performance unit 82a that is provided in the lockup clutch control unit 82 swiftly narrows down a pack clearance of the lockup clutch 32. Therefore, the lockup clutch control unit 82 performs lockup initial oil pressure control (quick fill) for quickly supplying working fluid to the engagement-side oil chamber 20a of the torque converter 20 by temporarily raising the lockup command pressure of the linear solenoid valve SLU. Incidentally, the aforementioned pack clearance is, for example, a clearance that is created until the pressing member 48 that is provided in the lockup clutch 32 comes into abutment on the first friction plates 38 from a position where the pressing member 48 is returned by the return spring 52.

A lockup initial oil pressure determination unit 82b determines whether or not lockup initial oil pressure control has been performed or started by the lockup initial oil pressure control performance unit 82a. For example, the lockup initial oil pressure determination unit 82b narrows down the pack clearance of the lockup clutch 32 upon a changeover from the lockup-off region to the slip operation region or the lockup-on region. Therefore, the lockup initial oil pressure determination unit 82b determines that lockup initial oil pressure control has been performed (started) when the lockup command pressure that is output to the linear solenoid valve SLU is temporarily raised.

After the lockup initial oil pressure determination unit 82b determines that lockup initial oil pressure control has been performed (started), a lockup initial oil pressure end determination unit 82c determines whether or not lockup initial oil pressure control has been ended. For example, the lockup initial oil pressure end determination unit 82c determines that lockup initial oil pressure control has been ended, for example, when the lockup command pressure that is output to the linear solenoid valve SLU is reduced from a temporarily raised value by a predetermined value.

A mode determination unit 84 determines whether the fuel-efficient running mode in which priority is placed on fuel economy or the driveability running mode in which priority is placed on driveability is selected as a running mode of the vehicle 10. The mode determination unit 84 determines that the fuel-efficient running mode is selected as the running mode of the vehicle 10, for example, when the driver operates the fuel-efficient running mode selection switch 74. Furthermore, the mode determination unit 84 determines that the driveability running mode is selected as the running mode of the vehicle 10 when the driver operates the driveability running mode selection switch 76.

A low pressure generation determination unit 86 determines whether or not a low pressure generation region where the oil pressure that is supplied to the oil pressure control circuit 54, namely, the oil pressure that is generated by the oil pump 33 is relatively low is in use. For example, when the rotational speed Np of the oil pump 33 that is detected by the oil pump rotation sensor 78 is lower than a predetermined value Npc, the low pressure generation determination unit 86 determines that the low pressure generation region where the oil pressure that is generated by the oil pump 33 is relatively low is in use. Incidentally, the aforementioned predetermined value Npc is, for example, a value at which the oil pressure does not become insufficient even when lockup initial oil pressure control and shift initial oil pressure control are performed in an overlapping manner. Moreover, the aforementioned predetermined value Npc is the rotational speed Np of the oil pump 33 determined in advance through an experiment or the like.

When the performance of shift control by the shift control unit 80 is started during the performance of lockup control by the lockup clutch control unit 82, or when the performance of lockup control by the lockup clutch control unit 82 is started during the performance of shift control by the shift control unit 80, a simultaneous performance control unit 88 performs lockup control by the lockup clutch control unit 82 and shift control by the shift control unit 80 in an overlapping manner as a whole, such that lockup initial oil pressure control and shift initial oil pressure control do not overlap with each other.

When the low pressure generation determination unit 86 determines that the low pressure generation region is in use and the mode determination unit 84 determines that the running mode of the vehicle 10 is the fuel-efficient running mode, the simultaneous performance control unit 88 places priority on the performance of lockup initial oil pressure control in the case where a determination on lockup initial oil pressure control by the lockup initial oil pressure determination unit 82b and a determination on shift initial oil pressure control by the shift initial oil pressure determination unit 80b overlap with each other. Therefore, the simultaneous performance control unit 88 controls the shift initial oil pressure control performance unit 80a in such a manner as to delay the start of shift initial oil pressure control. Besides, when the lockup initial oil pressure end determination unit 82c determines that lockup initial oil pressure control has been ended after the start of shift initial oil pressure control is delayed as a result of placing priority on the performance of lockup initial oil pressure control, the simultaneous performance control unit 88 controls the shift initial oil pressure control performance unit 80a in such a manner as to resume shift initial oil pressure control after the lapse of a certain time tc1 since the determination. Incidentally, the aforementioned certain time tc1 is a time that extends until the oil pressure becomes stable after lockup initial oil pressure control and that is set in advance through an experiment or the like such that the oil pressure does not become insufficient even when shift initial oil pressure control is resumed after lockup initial oil pressure control.

Besides, when the low pressure generation determination unit 86 determines that the low pressure generation region is in use and the mode determination unit 84 determines that the running mode of the vehicle 10 is the driveability running mode, the simultaneous performance control unit 88 places priority on the performance of shift initial oil pressure control in the case where a determination on lockup initial oil pressure control by the lockup initial oil pressure determination unit 82b and a determination on shift initial oil pressure control by the shift initial oil pressure determination unit 80b overlap with each other. Therefore, the simultaneous performance control unit 88 controls the lockup initial oil pressure control performance unit 82a of the lockup clutch control unit 82 in such a manner as to delay lockup initial oil pressure control. Besides, when the shift initial oil pressure end determination unit 80c determines that shift initial oil pressure control has been ended after lockup initial oil pressure control is delayed as a result of placing priority on the performance of shift initial oil pressure control, the simultaneous performance control unit 88 controls the lockup initial oil pressure control performance unit 82a of the lockup clutch control unit 82 in such a manner as to resume lockup initial oil pressure control after the lapse of a certain time tc2 since the determination. Incidentally, the aforementioned certain time tc2 is a time that extends until the oil pressure becomes stable after shift initial oil pressure control and that is set in advance through an experiment or the like such that the oil pressure does not become insufficient even when lockup initial oil pressure control is resumed after shift initial oil pressure control.

Figure 6:
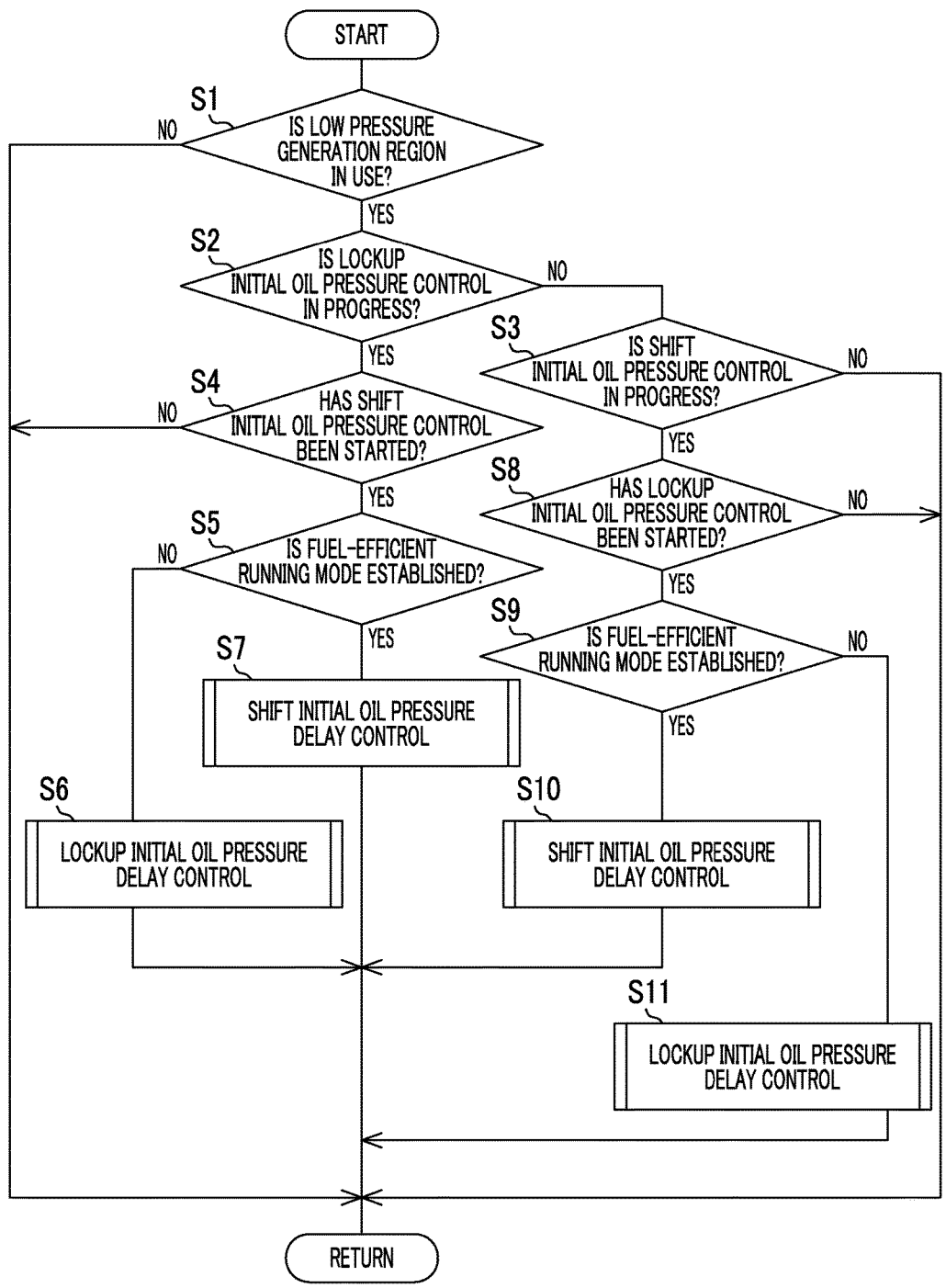
FIG. 6 is a flowchart illustrating an exemplary control operation of lockup initial oil pressure control and shift initial oil pressure control at the time when shift control is performed during the performance of lockup control or when lockup control is performed during the performance of shift control, in an electronic control unit of FIG. 1.
Figure 7:
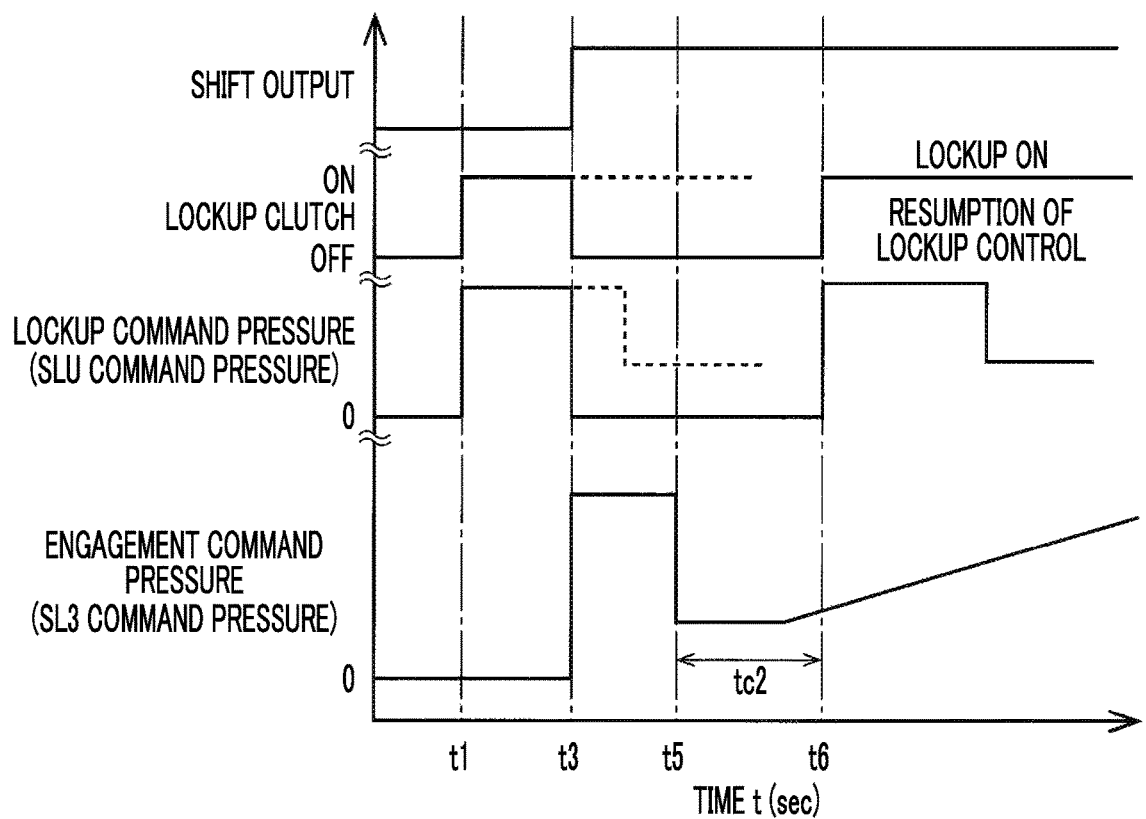
FIG. 7 is a time chart in the case where the control operation of S6 shown in the flowchart of FIG. 6 is carried out.
Figure 8:
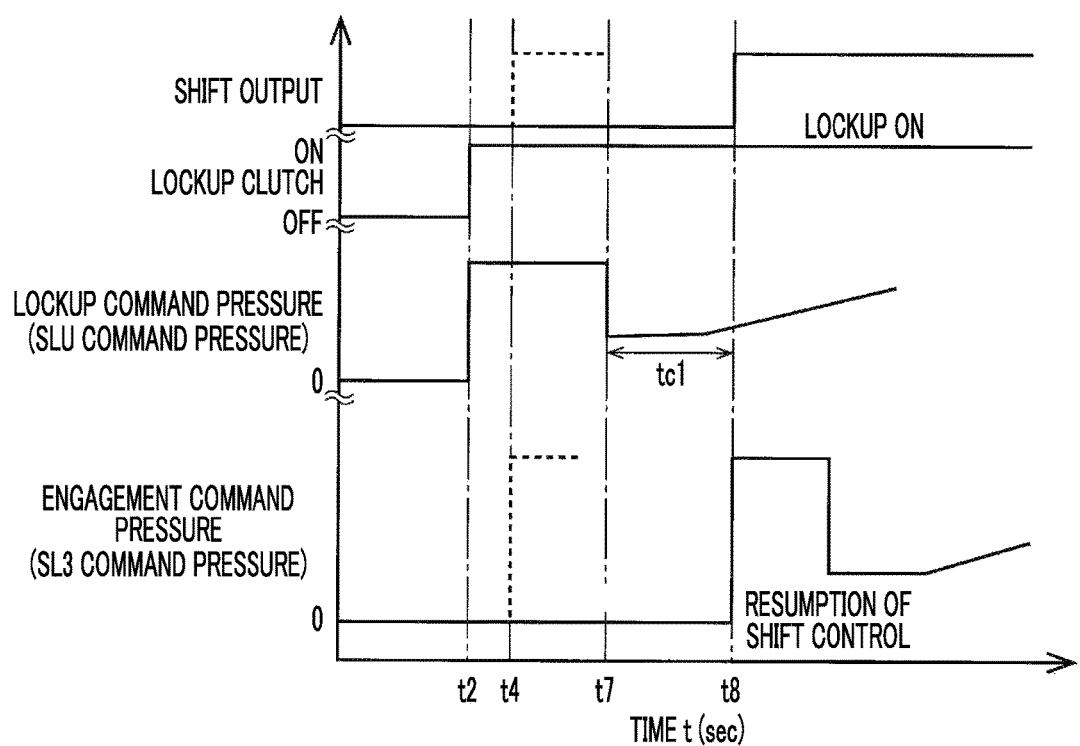
FIG. 8 is a time chart in the case where the control operation of S7 shown in the flowchart of FIG. 6 is carried out.
Figure 9:
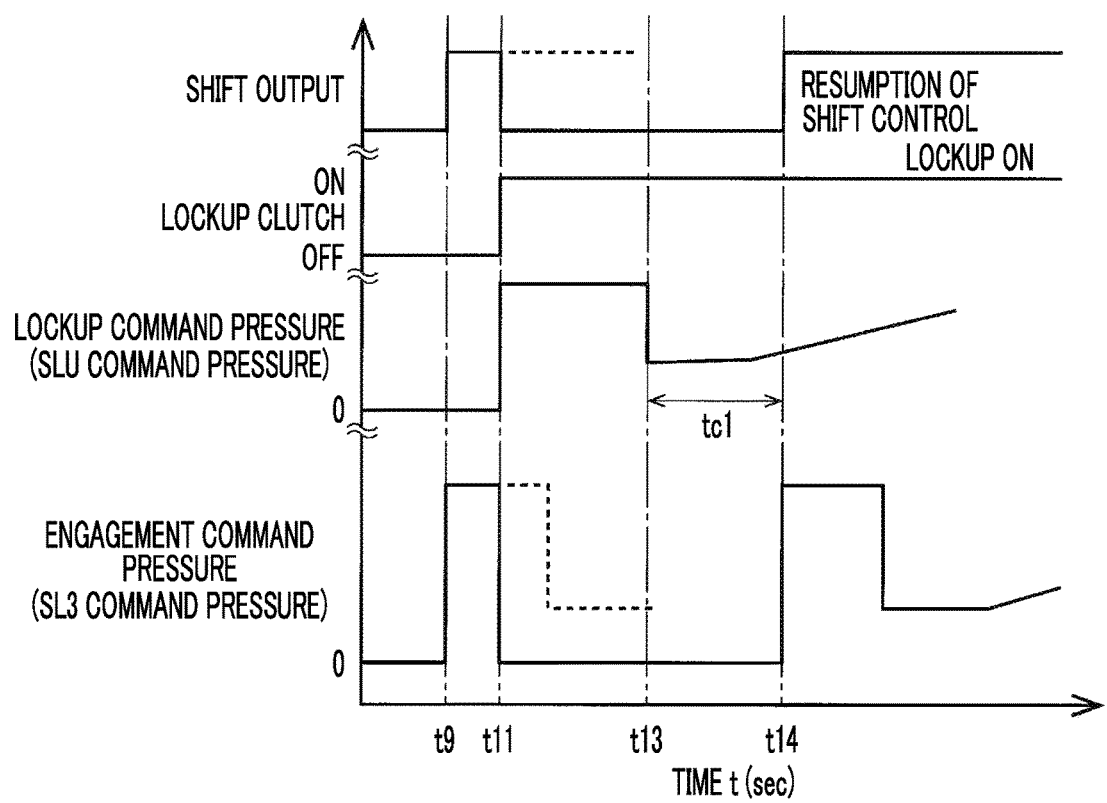
FIG. 9 is a time chart in the case where the control operation of S10 shown in the flowchart of FIG. 6 is carried out.
Figure 10:
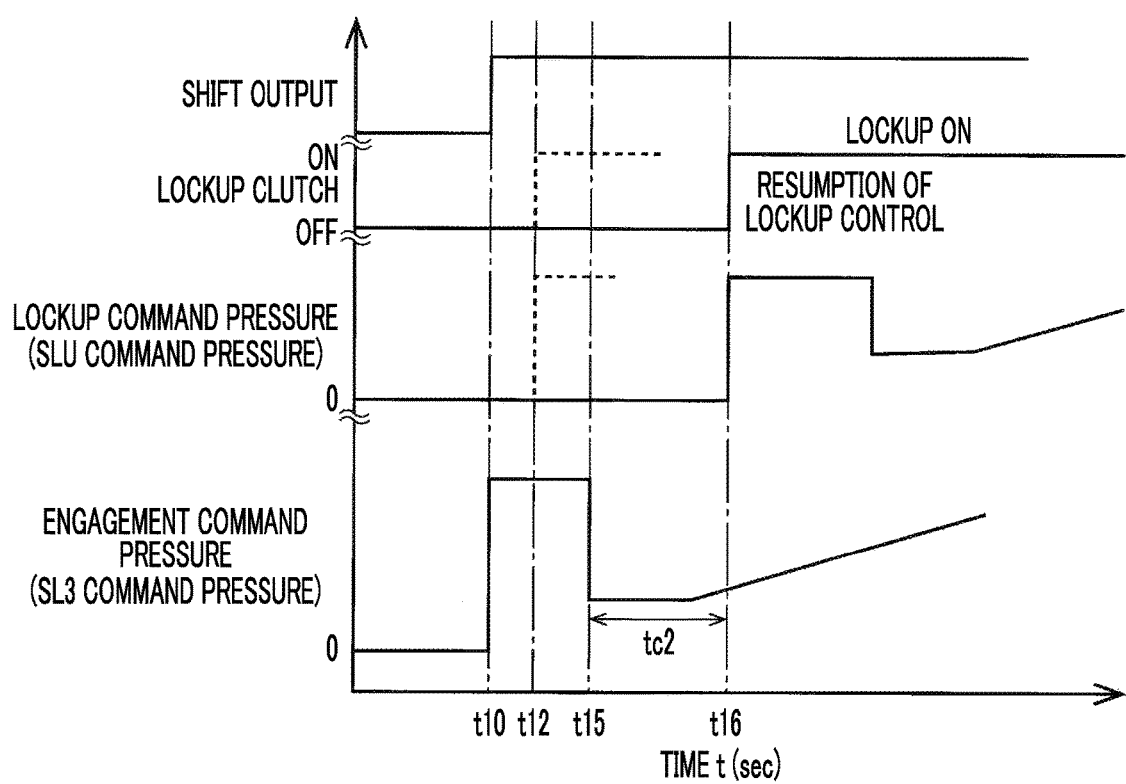
FIG. 10 is a time chart in the case where the control operation of S11 shown in the flowchart of FIG. 6 is carried out.

FIG. 6 is a flowchart illustrating an exemplary control operation of lockup initial oil pressure control and shift initial oil pressure control at the time when shift control is performed during the performance of lockup control or when lockup control is performed during the performance of shift control in the electronic control unit 56. Incidentally, the flowchart of FIG. 6 is a flowchart showing the flow after the performance of lockup control and shift control at the same time. Besides, shift control in the flowchart of FIG. 6 is, for example, shift control from the second shift stage "2nd" to the third shift stage "3rd". Besides, each of FIGS. 7 to 10 is a time chart showing the control operation indicated by the flowchart of FIG. 6.

First of all, in step (the word "step" will be omitted hereinafter) S1 corresponding to the function of the low pressure generation determination unit 86, it is determined whether or not the low pressure generation region is in use. If the result of the determination in this S1 is negative, S1 is carried out again. However, if the result of the determination in S1 is affirmative, S2 corresponding to the function of the lockup initial oil pressure determination unit 82b is carried out. In the aforementioned S2, it is determined whether or not lockup initial oil pressure control has been started. If the result of the determination in S2 is negative, S3 corresponding to the function of the shift initial oil pressure determination unit 80b is carried out. If the result of the determination in S2 is affirmative (at a time point t1 in FIG. 7 and at a time point t2 in FIG. 8), S4 corresponding to the function of the shift initial oil pressure determination unit 80b of the shift control unit 80 is carried out.

In the aforementioned S4, it is determined whether or not shift initial oil pressure control has been started. If the result of the determination in this S4 is negative, the aforementioned S1 is carried out. However, if the result of the determination in this S4 is affirmative (at a time point t3 in FIG. 7 and at a time point t4 in FIG. 8), S5 corresponding to the function of the mode determination unit 84 is carried out. In the aforementioned S5, it is determined whether the running mode of the vehicle 10 is the fuel-efficient running mode or the driveability running mode, namely, whether or not the running mode of the vehicle 10 is the fuel-efficient running mode. If the result of the determination in S5 is negative, namely, if the running mode of the vehicle 10 is the driveability running mode, S6 corresponding to the functions of the simultaneous performance control unit 88 and the shift initial oil pressure end determination unit 80c is carried out. If the result of the determination in S5 is affirmative, namely, if the running mode of the vehicle 10 is the fuel-efficient running mode, S7 corresponding to the functions of the simultaneous performance control unit 88 and the lockup initial oil pressure end determination unit 82c is carried out.

Figure 11:
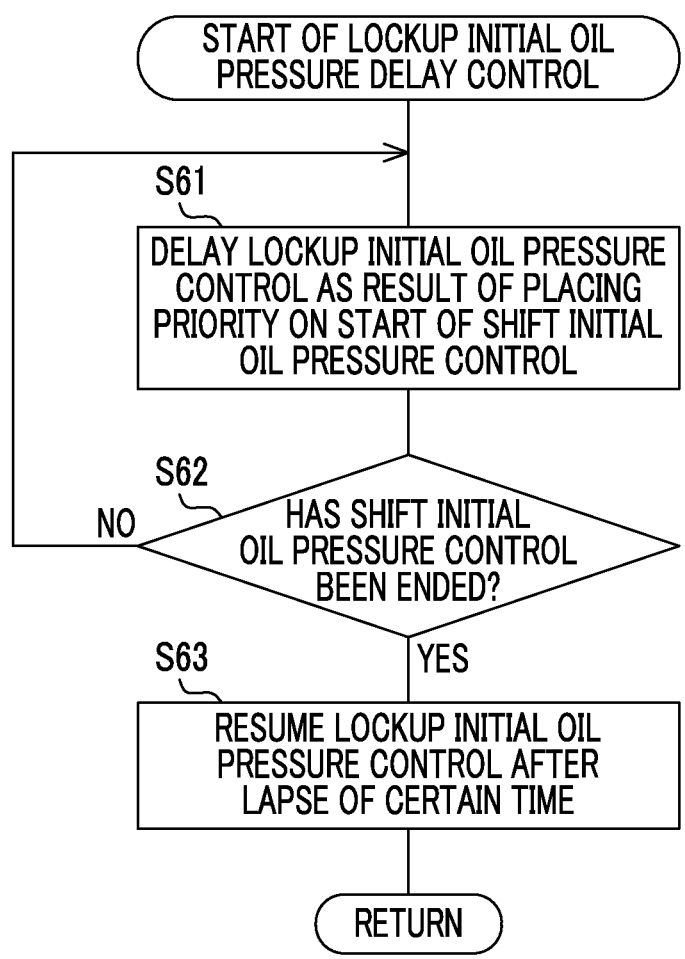
FIG. 11 is a flowchart illustrating the control operation of lockup initial oil pressure delay control in detail in steps that are provided in the flowchart of FIG. 6.

In the aforementioned S6, lockup initial oil pressure delay control is started (performed). In the aforementioned S6, as indicated by a flowchart shown in FIG. 11, S61 corresponding to the function of the simultaneous performance control unit 88 is carried out. In the aforementioned S61, lockup initial oil pressure control is delayed as a result of placing priority on the start of shift initial oil pressure control. Subsequently, S62 corresponding to the function of the shift initial oil pressure end determination unit 80c is carried out. In the aforementioned S62, it is determined whether or not shift initial oil pressure control has been ended. If the result of the determination in S62 is negative, the aforementioned S61 is carried out again. If the result of the determination in S62 is affirmative (at a time point t5 in FIG. 7), S63 corresponding to the function of the simultaneous performance control unit 88 is carried out. In the aforementioned S63, lockup initial oil pressure control is resumed after the lapse of the certain time tc2 (at a time point t6 in FIG. 7) since the end of shift initial oil pressure control (at the time point t5 in FIG. 7). Incidentally, broken lines in a time chart of FIG. 7 indicate a case where lockup initial oil pressure control is not delayed in the aforementioned S6 (S61).

Figure 12:
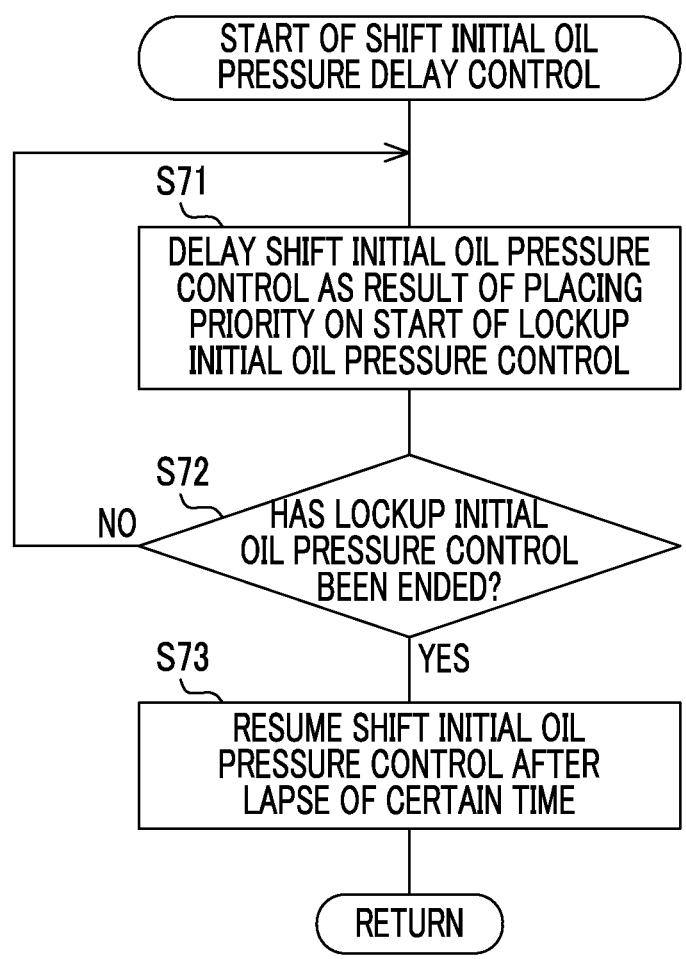
FIG. 12 is a flowchart illustrating the control operation of shift initial oil pressure delay control in detail in the steps that are provided in the flowchart of FIG. 6.

In the aforementioned S7, shift initial oil pressure delay control is started (performed). In the aforementioned S7, as indicated by a flowchart shown in FIG. 12, S71 corresponding to the function of the simultaneous performance control unit 88 is carried out. In the aforementioned S71, shift initial oil pressure control is delayed as a result of placing priority on the start of lockup initial oil pressure control. Subsequently, S72 corresponding to the function of the lockup initial oil pressure end determination unit 82c is carried out. In the aforementioned S72, it is determined whether or not lockup initial oil pressure control has been ended. If the result of the determination in S72 is negative, the aforementioned S71 is carried out again. If the result of the determination in S72 is affirmative (at a time point t7 in FIG. 8), S73 corresponding to the function of the simultaneous performance control unit 88 is carried out. In the aforementioned S73, shift initial oil pressure control is resumed after the lapse of the certain time tc1 (at a time point t8 in FIG. 8) since the end of lockup initial oil pressure control (at the time point t7 in FIG. 8). Incidentally, broken lines in a time chart of FIG. 8 indicate a case where lockup initial oil pressure control is not delayed in the aforementioned S7 (S71).

Subsequently, in the S3, it is determined whether or not shift initial oil pressure control has been started, namely, whether or not shift control quick fill is in progress. If the result of the determination in S3 is negative, the aforementioned S1 is carried out. If the result of the determination in S3 is affirmative (at a time point t9 in FIG. 9 and at a time point t10 in FIG. 10), S8 corresponding to the function of the lockup initial oil pressure determination unit 82b is carried out. In the aforementioned S8, it is determined whether or not lockup initial oil pressure control has been started. If the result of the determination in S8 is negative, the aforementioned S1 is carried out. If the result of the determination in S8 is affirmative (at a time point t11 in FIG. 9 and at a time point t12 in FIG. 10), S9 corresponding to the function of the mode determination unit 84 is carried out. In the aforementioned S9, it is determined whether the running mode of the vehicle 10 is the fuel-efficient running mode or the driveability running mode, namely, whether or not the running mode of the vehicle 10 is the fuel-efficient running mode. If the result of the determination in S9 is affirmative, namely, if the running mode of the vehicle 10 is the fuel-efficient running mode, S10 corresponding to the functions of the simultaneous performance control unit 88 and the lockup initial oil pressure end determination unit 82c is carried out. If the result of the determination in S9 is negative, namely, if the running mode of the vehicle 10 is the driveability running mode, S11 corresponding to the functions of the simultaneous performance control unit 88 and the shift initial oil pressure end determination unit 80c is carried out.

In the aforementioned S10, shift initial oil pressure delay control is started (performed). In the aforementioned S10, as indicated by the flowchart shown in FIG. 12, S71 corresponding to the function of the simultaneous performance control unit 88 is carried out. Incidentally, in the aforementioned S10, the same control operation as in the aforementioned S7 is carried out. In the aforementioned S71, shift initial oil pressure control is delayed as a result of placing priority on the start of lockup initial oil pressure control. Subsequently, S72 corresponding to the function of the lockup initial oil pressure end determination unit 82c is carried out. In the aforementioned S72, it is determined whether or not lockup initial oil pressure control has been ended. If the result of the determination in S72 is negative, the aforementioned S71 is carried out again. If the result of the determination in S72 is affirmative (at a time point t13 in FIG. 9), S73 corresponding to the function of the simultaneous performance control unit 88 is carried out. In the aforementioned S73, shift initial oil pressure control is resumed after the lapse of the certain time tc1 (at a time point t14 in FIG. 9) since the end of lockup initial oil pressure control (at the time point t13 in FIG. 9). Incidentally, broken lines in a time chart of FIG. 9 indicate a case where shift initial oil pressure control is not delayed in the aforementioned S10 (S71).

In the aforementioned S11, lockup initial oil pressure delay control is started (performed). In the aforementioned S11, as indicated by the flowchart shown in FIG. 11, S61 corresponding to the function of the simultaneous performance control unit 88 is carried out. Incidentally, in the aforementioned S11, the same control operation as in the aforementioned S6 is carried out. In the aforementioned S61, lockup initial oil pressure control is delayed as a result of placing priority on the start of shift initial oil pressure control. Subsequently, S62 corresponding to the function of the shift initial oil pressure end determination unit 80c is carried out. In the aforementioned S62, it is determined whether or not shift initial oil pressure control has been ended. If the result of the determination in S62 is negative, the aforementioned S61 is carried out again. If the result of the determination in S62 is affirmative (at a time point t15 in FIG. 10), S63 corresponding to the function of the simultaneous performance control unit 88 is carried out. In the aforementioned S63, lockup initial oil pressure control is resumed after the lapse of the certain time tc2 (at a time point t16 in FIG. 10) since the end of shift initial oil pressure control (at the time point t15 in FIG. 10). Incidentally, broken lines in a time chart of FIG. 10 indicate a case where lockup initial oil pressure control is not delayed in the aforementioned S11 (S61).

As described above, after lockup initial oil pressure control is completed as a result of placing priority on lockup initial oil pressure control when shift control is performed during the performance of lockup control, the electronic control unit 56 of the power transmission device 16 according to the present embodiment of the disclosure starts shift initial oil pressure control. Besides, after shift initial oil pressure control is completed as a result of placing priority on shift initial oil pressure control when lockup control is performed during the performance of shift control, the electronic control unit 56 starts lockup initial oil pressure control. Therefore, even when shift control and lockup control are performed at the same time as a whole, shift initial oil pressure control and lockup initial oil pressure control are prevented from being performed in an overlapping manner. Accordingly, the oil pressure is restrained more than before from becoming insufficient when shift control and lockup control are performed at the same time.

Besides, after lockup initial oil pressure control is completed as a result of placing priority on lockup initial oil pressure control when the fuel-efficient running mode in which priority is placed on fuel economy is selected, the electronic control unit 56 of the power transmission device 16 according to the present embodiment of the disclosure starts shift initial oil pressure control. Therefore, lockup initial oil pressure control is performed in priority to shift initial oil pressure control. Accordingly, fuel economy is favorably improved, and shift initial oil pressure control and lockup initial oil pressure control are prevented from overlapping with each other.

Besides, after shift initial oil pressure control is completed as a result of placing priority on shift initial oil pressure control when the driveability running mode in which priority is placed on driveability is selected, the electronic control unit 56 of the power transmission device 16 according to the present embodiment of the disclosure starts lockup initial oil pressure control. Therefore, shift initial oil pressure control is performed in priority to lockup initial oil pressure control. Accordingly, driveability is favorably improved, and shift initial oil pressure control and lockup initial oil pressure control are prevented from overlapping with each other.

Next, another one of the embodiments of the disclosure will be described. Incidentally, components common to those of the foregoing first embodiment of the disclosure are denoted by the same reference symbols respectively, and description thereof will be omitted.

Figure 13:
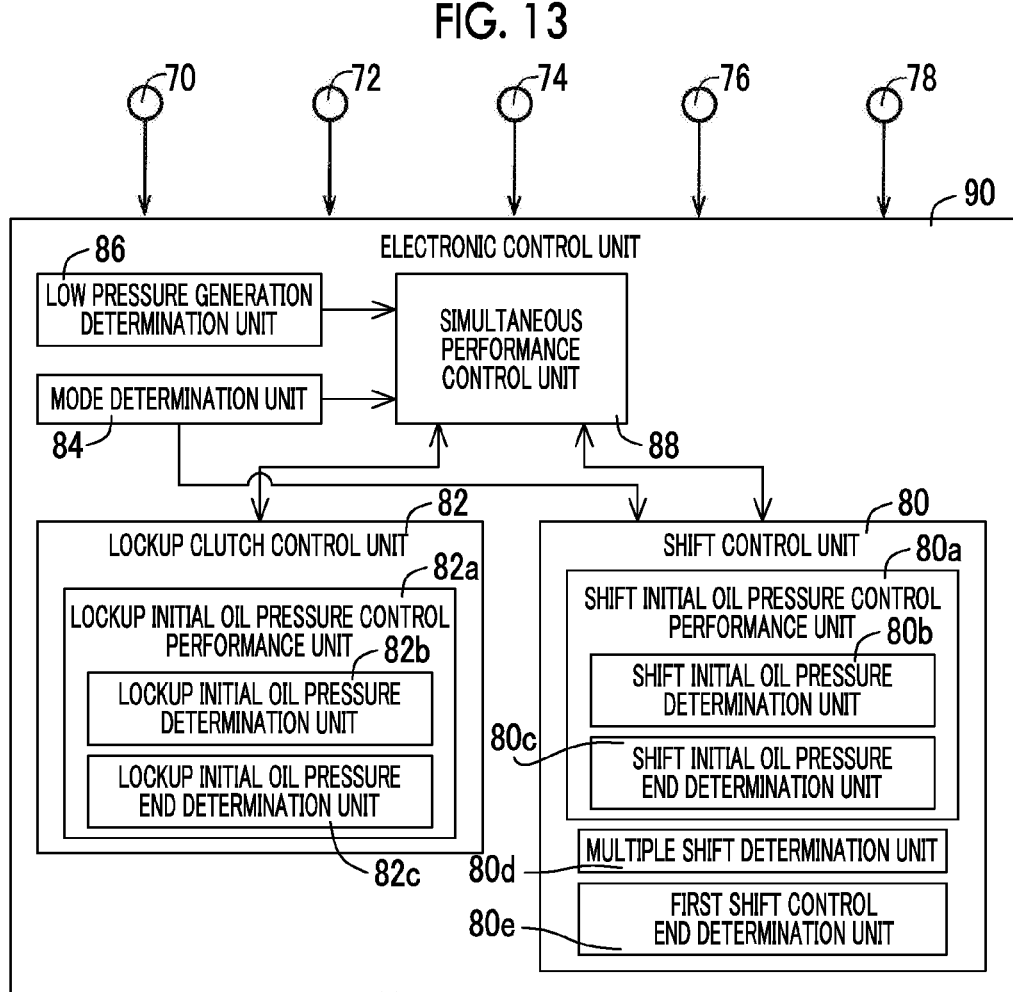
FIG. 13 is a functional block diagram illustrating an essential part of control functions with which an electronic control unit according to another one of the embodiments of the disclosure is endowed.
Figure 14:
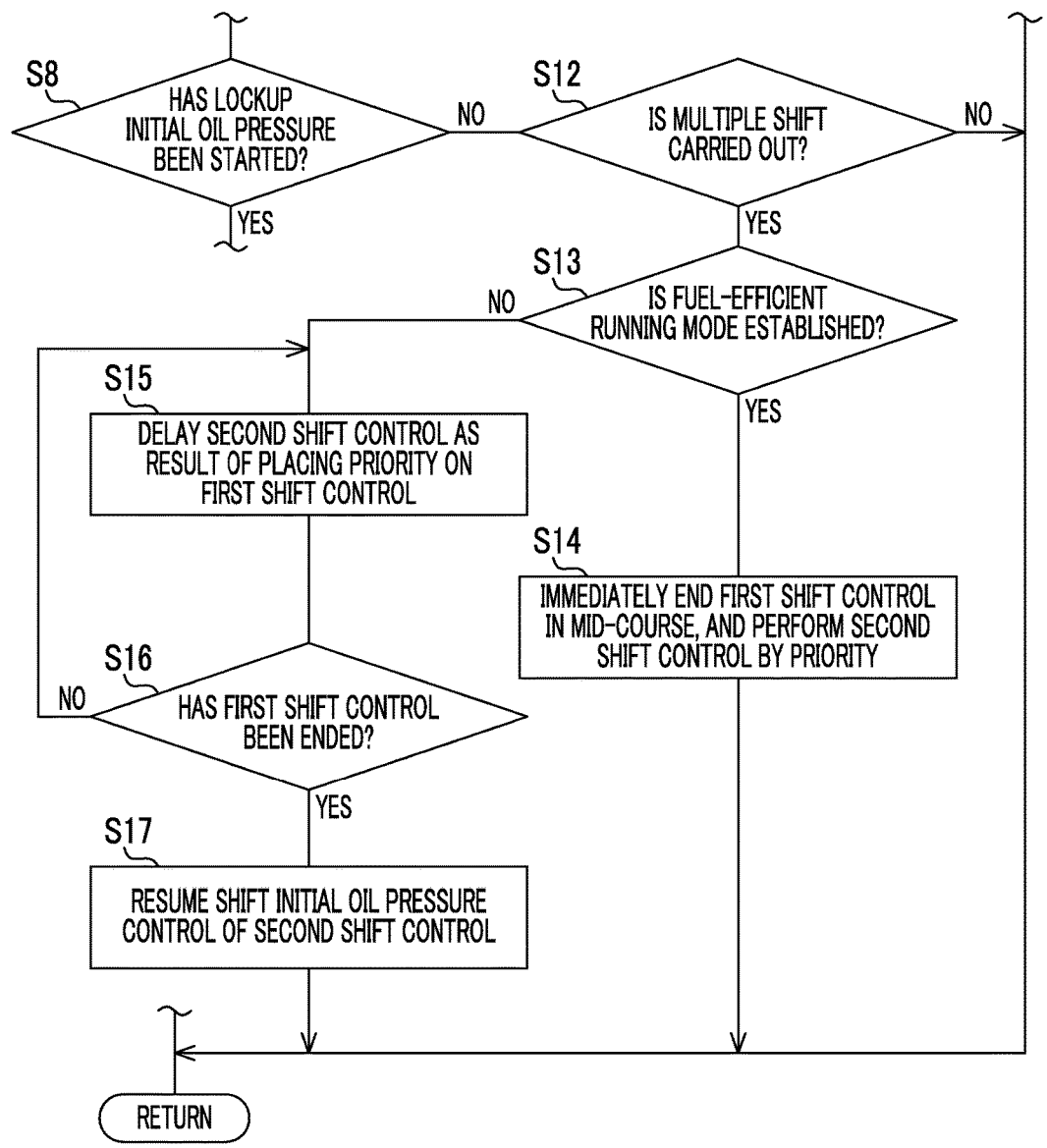
FIG. 14 is a flowchart illustrating an exemplary control operation of first shift control and second shift control at the time of a multiple shift when the performance of second shift control is commanded during the performance of first shift control, in the electronic control unit of FIG. 13.

FIGS. 13 and 14 are views illustrating an electronic control unit (an oil pressure control device) 90 according to the aforementioned another embodiment of the disclosure. The electronic control unit 90 according to the present embodiment of the disclosure is different from the electronic control unit 56 according to the first embodiment of the disclosure in that the functions of a multiple shift determination unit 80d, a first shift control end determination unit 80e and the like are added to the shift control unit 80. The electronic control unit 90 according to the present embodiment of the disclosure is substantially identical to the electronic control unit 56 according to the first embodiment of the disclosure in the other respects.

FIG. 13 is a view showing an input/output system of the electronic control unit 90, and is a functional block diagram illustrating an essential part of control functions performed by the electronic control unit 90. The multiple shift determination unit 80d shown in FIG. 13 determines whether or not a multiple shift is carried out to command the performance of second shift control for achieving a second shift during first shift control for achieving a first shift. When the performance of shift initial oil pressure control (quick fill) of second shift control for achieving the second shift, for example, from the third shift stage "3rd" to the second shift stage "2nd" is commanded during shift initial oil pressure control (quick fill) of first shift control for achieving the first shift, for example, from the fourth shift stage "4th" to the third shift stage "3rd", the multiple shift determination unit 80d determines that a multiple shift is carried out.

The first shift control end determination unit 80e determines whether or not first shift control has been ended. When the first shift, for example, from the fourth shift stage "4th" to the third shift stage "3rd" is achieved, the first shift control end determination unit 80e determines that first shift control has been ended.

When the low pressure generation determination unit 86 determines that the low pressure generation region is in use, the mode determination unit 84 determines that the running mode of the vehicle 10 is the fuel-efficient running mode, the shift initial oil pressure determination unit 80b determines that shift initial oil pressure control (quick fill) has been started, the lockup initial oil pressure determination unit 82b of the lockup clutch control unit 82 determines that lockup initial oil pressure control (quick fill) has not been started, and the multiple shift determination unit 80d determines that a multiple shift is carried out, the shift control unit 80 immediately ends shift initial oil pressure control of first shift control in mid-course, and then performs shift initial oil pressure control of second shift control.

Besides, when the low pressure generation determination unit 86 determines that the low pressure generation region is in use, the mode determination unit 84 determines that the running mode of the vehicle 10 is the driveability running mode, the shift initial oil pressure determination unit 80b determines that shift initial oil pressure control has been started, the lockup initial oil pressure determination unit 82b determines that lockup initial oil pressure control has not been started, and the multiple shift determination unit 80d determines that a multiple shift is carried out, the shift control unit 80 performs shift initial oil pressure control of second shift control in a delayed manner as a result of placing priority on first shift control. Besides, when the first shift control end determination unit 80e determines that first shift control has been ended after shift initial oil pressure control of second shift control is delayed as a result of placing priority on first shift control, the shift control unit 80 performs shift initial oil pressure control of second shift control in a resuming manner.

FIG. 14 is a flowchart showing an exemplary control operation of first shift control and second shift control at the time when the performance of second shift control is commanded during the performance of first shift control (when a multiple shift is carried out) in the electronic control unit 90. Incidentally, the flowchart of FIG. 14 is a flowchart showing the flow of part of the flowchart of FIG. 6, namely, a flowchart showing the flow after negation of the result of the determination in S8 of the flowchart of FIG. 6.

In the flowchart of FIG. 14, if the result of the determination in S8 is negative, S12 corresponding to the function of the multiple shift determination unit 80d is carried out. In the aforementioned S12, it is determined whether or not a multiple shift is carried out. If the result of the determination in S12 is negative, S1 of FIG. 6 is carried out again. If the result of the determination in S12 is affirmative, S13 corresponding to the function of the mode determination unit 84 is carried out. In the aforementioned S13, it is determined whether the running mode of the vehicle 10 is the fuel-efficient running mode or the driveability running mode, namely, whether or not the running mode of the vehicle 10 is the fuel-efficient running mode. If the result of the determination in S13 is affirmative, namely, if the running mode of the vehicle 10 is the fuel-efficient running mode, S14 corresponding to the function of the shift control unit 80 is carried out. If the result of the determination in S13 is negative, namely, if the running mode of the vehicle 10 is the driveability running mode, S15 corresponding to the function of the shift control unit 80 is carried out.

In the aforementioned S14, shift initial oil pressure control of first shift control is immediately ended, and shift initial oil pressure control of second shift control is performed by priority. In the aforementioned S15, shift initial oil pressure control of second shift control is delayed as a result of placing priority on first shift control. Subsequently, in S16 corresponding to the function of the first shift control end determination unit 80e, it is determined whether or not first shift control has been ended. If the result of the determination in S16 is negative, S15 is carried out again. If the result of the determination in S16 is affirmative, S17 corresponding to the function of the shift control unit 80 is carried out. In the aforementioned S17, shift initial oil pressure control of second shift control is resumed.

As described above, after the first shift is completed as a result of placing priority on first shift control when the performance of second shift control for achieving the second shift is commanded during first shift control for achieving the first shift and the driveability running mode in which priority is placed on driveability is selected in shift control, the electronic control unit 90 of the power transmission device 16 according to the present embodiment of the disclosure starts shift initial oil pressure control of second shift control. Therefore, shift initial oil pressure control in first shift control and shift initial oil pressure control in second shift control are prevented from occurring at the same time. Therefore, the oil pressure in a multiple shift is favorably restrained from becoming insufficient. Besides, in the multiple shift, shift initial oil pressure control of the second shift control is started after the first shift is completed as a result of placing priority on the first shift control. Therefore, driveability is favorably improved.

Besides, when the performance of second shift control for achieving the second shift is commanded during first shift control for achieving the first shift and the fuel-efficient running mode in which priority is placed on fuel economy is selected in shift control, the electronic control unit 90 of the power transmission device 16 according to the present embodiment of the disclosure immediately ends first shift control in mid-course as a result of placing priority on second shift control. Therefore, shift initial oil pressure control in first shift control and shift initial oil pressure control in second shift control are prevented from occurring at the same time. Therefore, the oil pressure in a multiple shift is favorably retrained from becoming insufficient. Besides, in a multiple shift, first shift control is immediately ended in mid-course as a result of placing priority on second shift control. Therefore, fuel economy is favorably improved.

Figure 15:
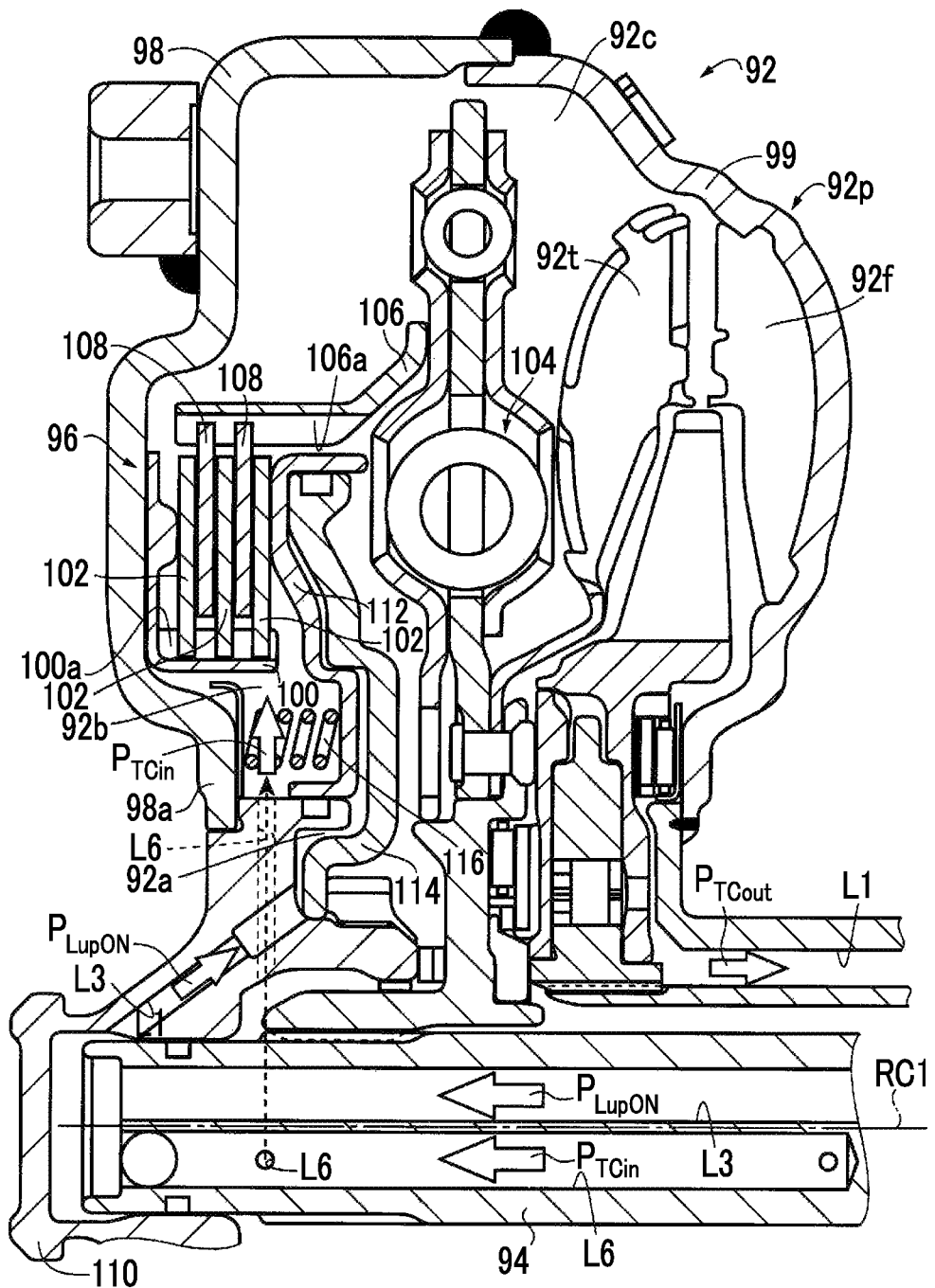
FIG. 15 is a cross-sectional view illustrating a torque converter according to still another one of the embodiments of the disclosure.

FIG. 15 is a view illustrating a power transmission device (a vehicular power transmission device) according to still another one of the embodiments of the disclosure. The power transmission device according to the present embodiment of the disclosure is different from the power transmission device 16 according to the first embodiment of the disclosure in that a torque converter 92 is different in shape from the torque converter 20. The power transmission device according to the present embodiment of the disclosure is substantially identical to the power transmission device 16 according to the first embodiment of the disclosure in the other respects.

As shown in FIG. 15, the torque converter 92 is equipped with a front cover 98, a rear cover 99, a plurality of pump blades 92f, a pump impeller 92p and a turbine impeller 92t. The front cover 98 and the rear cover 99 are welded to each other. The plurality of the pump blades 92f are fixed to an inner side of the rear cover 99. The pump impeller 92p is coupled to the crankshaft 12a of the engine 12 in such a manner as to enable power transmission, and is disposed in such a manner as to rotate around an axial center RC1. The turbine impeller 92t is opposed to the rear cover 99, and is coupled to a transmission input shaft 94, which is an input rotary member of the automatic transmission 22 having a function similar to that of the transmission input shaft 30 according to the first embodiment of the disclosure, in such a manner as to enable power transmission. The torque converter 92 is equipped with a lockup clutch 96 that can directly couple the pump impeller 92p and the turbine impeller 92t (i.e., input/output rotary members of the torque converter 92) to each other. As described hitherto, the torque converter 92 functions as a fluid-type transmission device equipped with the lockup clutch 96 that is provided in the power transmission path between the engine 12 and the automatic transmission 22.

As shown in FIG. 15, the lockup clutch 96 is a multi-plate clutch. The lockup clutch 96 is equipped with a first annular member 100, a plurality of (three in the present embodiment of the disclosure) first annular friction plates 102, a second annular member 106, a plurality of (two in the present embodiment of the disclosure) second annular friction plates 108, an annular pressing member 112, an annular fixed member 114 and a return spring 116. The first annular member 100 is fixed to the front cover 98, which is integrally coupled to the pump impeller 92p, through, for example, welding. The plurality of the first annular friction plates 102 are engaged with outer peripheral spline teeth 100a that are formed on an outer periphery of the first annular member 100, relatively unrotatably around the axial center RC1 and movably in the direction of the axial center RC1. The second annular member 106 is coupled to the transmission input shaft 94 and the turbine impeller 92t via a damper device 104 that is provided in the torque converter 92, in such a manner as to enable power transmission. The plurality of the second annular friction plates 108 are engaged with inner peripheral spline teeth 106a that are formed on an inner periphery of the second annular member 106, relatively unrotatably around the axial center RC1 and movably in the direction of the axial center RC1. Furthermore, the plurality of the second annular friction plates 108 are disposed among the plurality of the first friction plates 102. The annular pressing member 112 is supported by a hub member 110 movably in the direction of the axial center RC1, and is opposed to the front cover 98. The hub member 110 is fixed to an inner periphery portion 98a of the front cover 98, and is supported in such a manner as to be able to rotate an end portion of the transmission input shaft 94 on the front cover 98 side around the axial center RC1. The annular fixed member 114 is supported by the hub member 110 at a fixed position, and is disposed opposite the pressing member 112 on the other side of the front cover 98 side of the pressing member 112. The return spring 116 urges the pressing member 112 toward the fixed member 114.

As shown in FIG. 15, an engagement-side oil chamber 92a, a release-side oil chamber 92b and a supply oil chamber 92c are formed in the torque converter 92. The engagement-side oil chamber 92a is formed between the pressing member 112 and the fixed member 114 to engage the lockup clutch 96. The release-side oil chamber 92b is formed between the pressing member 112 and the front cover 98 to release the lockup clutch 96. The supply oil chamber 92c is formed by a region that is in the rear cover 99 and the front cover 98, to which working fluid is supplied from the release-side oil chamber 92b, and that excludes the engagement-side oil chamber 92a and the release-side oil chamber 92b. In the torque converter 92, for example, when the lockup-on pressure $P_{LupON}$ (kPa) of the engagement-side oil chamber 92a is relatively high and the pressing member 112 is moved toward the front cover 98 in the direction of the axial center RC1, the first friction plates 102 clamp the second friction plates 108 respectively through the pressing member 112, so the pump impeller 92$p$ that is coupled to the first annular member 100, and the turbine impeller 92$t$ that is coupled to the second annular member 106 rotate integrally with each other. Besides, for example, when the lockup-on pressure P$_{LupON}$ (kPa) of the engagement-side oil chamber 92$a$ is relatively low and the pressing member 112 is moved to the other side of the front cover 98 side in the direction of the axial center RC1, the pump impeller 92$p$ that is coupled to the first annular member 100, and the turbine impeller 92$t$ that is coupled to the second annular member 106 rotate relatively to each other.

The lockup clutch 96 is a hydraulic multiplate friction clutch in which the plurality of the first friction plates 102 and the plurality of the second friction plates 108 are frictionally engaged with each other respectively through the control of the lockup differential pressure $\Delta P$ ($=P_{LupON}-(P_{TCin}+P_{TCout})/2$) by the foregoing oil pressure control circuit 54. The lockup differential pressure $\Delta P$ is a differential pressure between the lockup-on pressure P$_{LupON}$ (kPa) of the engagement-side oil chamber 92$a$ and an average (($P_{TCin}+P_{TCout}$)/2) of the torque converter-in pressure P$_{TCin}$ (kPa) of the release-side oil chamber 92$b$ and the torque converter-out pressure P$_{TCout}$ (kPa) that is discharged from the supply oil chamber 92$c$. Besides, in the lockup clutch 96, the lockup differential pressure $\Delta P$ is controlled via the oil pressure control circuit 54 by the electronic control unit 56. For example, the lockup clutch 96 is changed over to one of the following operation states, that is, a lockup release state (lockup-off), a lockup slip state (a slip state) and a lockup state (lockup-on). The lockup release state is a state where the lockup differential pressure $\Delta P$ is negative and the lockup clutch 96 is released. The lockup slip state is a state where the lockup differential pressure $\Delta P$ is equal to or higher than zero and the lockup clutch 96 is half-engaged while slipping. The lockup state is a state where the lockup differential pressure $\Delta P$ is maximized and the lockup clutch 96 is completely engaged.

Figure 16:
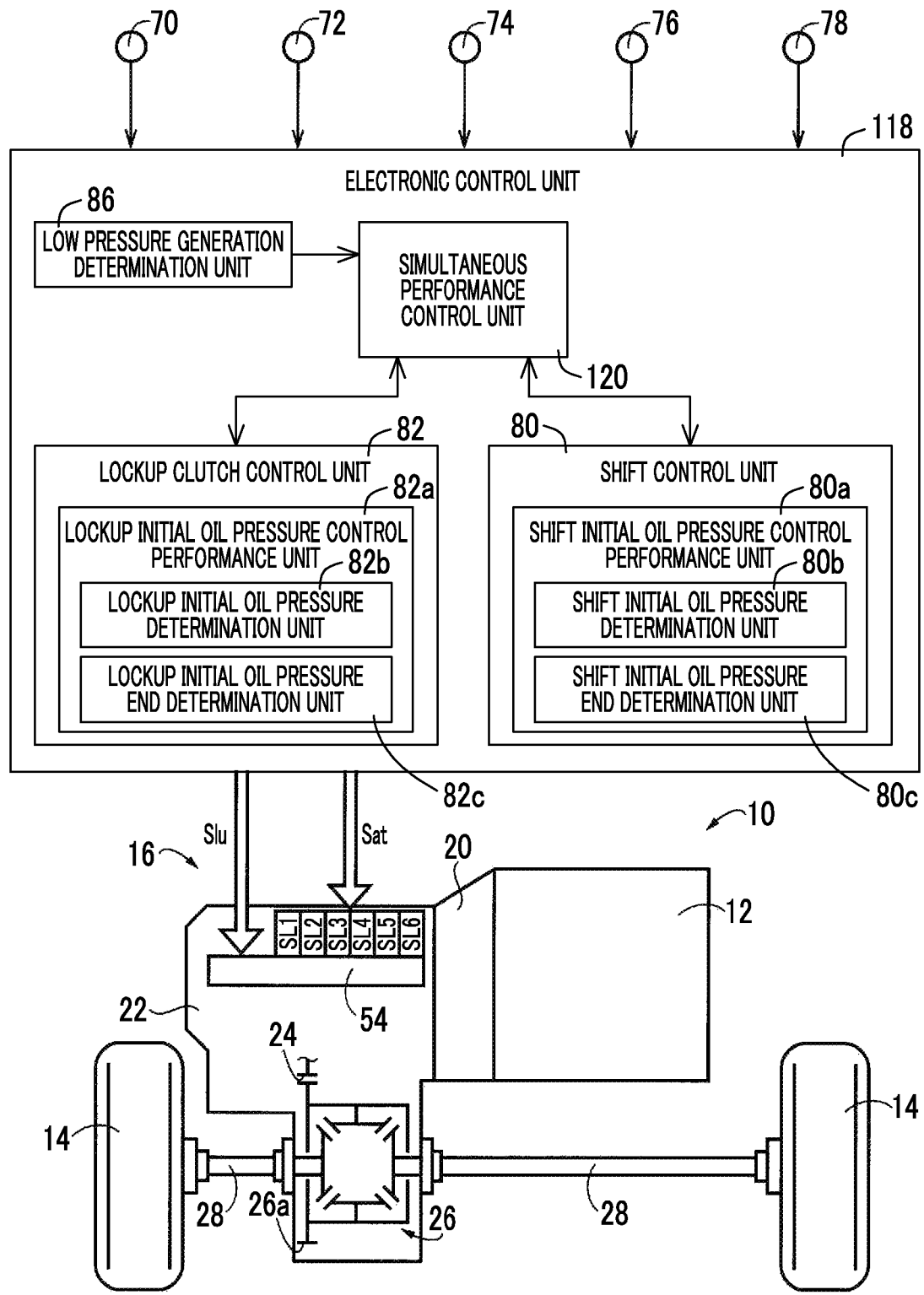
FIG. 16 is a functional block diagram illustrating an essential part of control functions with which an electronic control unit according to still another embodiments of the disclosure is endowed.

FIGS. 16 and 17 are views illustrating an electronic control unit (an oil pressure control device) 118 according to still another one of the embodiments of the disclosure. The electronic control unit 118 according to the present embodiment of the disclosure is different from the electronic control unit 56 according to the first embodiment of the disclosure in that the function of the mode determination unit 84 is not provided, and in that a simultaneous performance control unit 120 is different in function from the simultaneous performance control unit 88 according to the first embodiment of the disclosure. The electronic control unit 118 according to the present embodiment of the disclosure is substantially identical to the electronic control unit 56 according to the first embodiment of the disclosure in the other respects.

FIG. 16 is a view showing an input/output system of the electronic control unit 118, and is a functional block diagram illustrating an essential part of control functions performed by the electronic control unit 118. When the performance of shift control by the shift control unit 80 is started during the performance of lockup control by the lockup clutch control unit 82, or when the performance of lockup control by the lockup clutch control unit 82 is started during the performance of shift control by the shift control unit 80, the simultaneous performance control unit 120 shown in FIG. 16 performs lockup control in the lockup clutch control unit 82 and shift control in the shift control unit 80 in an overlapping manner as a whole such that lockup initial oil pressure control and shift initial oil pressure control do not overlap with each other.

When the low pressure generation determination unit 86 determines that the low pressure generation region is in use, the shift initial oil pressure determination unit 80$b$ of the shift control unit 80 determines that shift initial oil pressure control has been started after the lockup initial oil pressure determination unit 82$b$ of the lockup clutch control unit 82 determines that lockup initial oil pressure control has been started, and the determination on lockup initial oil pressure control by the lockup initial oil pressure determination unit 82$b$ of the lockup clutch control unit 82 and the determination on shift initial oil pressure control by the shift initial oil pressure determination unit 80$b$ of the shift control unit 80 overlap with each other, the simultaneous performance control unit 120 controls the shift initial oil pressure control performance unit 80$a$ of the shift control unit 80 in such a manner as to delay the start of shift initial oil pressure control performed later, as a result of placing priority on the performance of lockup initial oil pressure control performed earlier. Besides, when the lockup initial oil pressure end determination unit 82$c$ determines that lockup initial oil pressure control has been ended after the start of shift initial oil pressure control is delayed as a result of placing priority on the performance of lockup initial oil pressure control, the simultaneous performance control unit 120 controls the shift initial oil pressure control performance unit 80$a$ of the shift control unit 80 in such a manner as to resume shift initial oil pressure control after the lapse of the certain time tc1 since the determination.

Besides, when the low pressure generation determination unit 86 determines that the low pressure generation region in in use, the lockup initial oil pressure determination unit 82$b$ determines that lockup initial oil pressure control has been started after the shift initial oil pressure determination unit 80$b$ of the shift control unit 80 determines that shift initial oil pressure control has been started, and the determination on lockup initial oil pressure control by the lockup initial oil pressure determination unit 82$b$ of the lockup clutch control unit 82 and the determination on shift initial oil pressure control by the shift initial oil pressure determination unit 80$b$ of the shift control unit 80 overlap with each other, the simultaneous performance control unit 120 controls the lockup initial oil pressure control performance unit 82$a$ of the lockup clutch control unit 82 in such a manner as to delay lockup initial oil pressure control performed later, as a result of placing priority on the performance of shift initial oil pressure control performed earlier. Besides, when the shift initial oil pressure end determination unit 80$c$ determines that shift initial oil pressure control has been ended after lockup initial oil pressure control is delayed as a result of placing priority on the performance of shift initial oil pressure control, the simultaneous performance control unit 120 controls the lockup initial oil pressure control performance unit 82$a$ of the lockup clutch control unit 82 in such a manner as to resume lockup initial oil pressure control after the lapse of the certain time tc2 since the determination.

FIG. 17 is a flowchart illustrating an exemplary control operation of lockup initial oil pressure control and shift initial oil pressure control at the time when shift control is performed during the performance of lockup control or when lockup control is performed during the performance of shift control in the electronic control unit 118. Incidentally, S1, S2, S3, S4 and S8 described in the flowchart of FIG. 17 have the same contents as S1, 2, S3, S4 and S8 in the flowchart of FIG. 6 respectively. Therefore, in the present embodiment of the disclosure, description of the aforementioned S1, S2, S3, S4 and S8 will be omitted. The flow after affirmation of the result of the determination in the aforementioned S4 and after affirmation of the result of the determination in the aforementioned S8 will be described.

If the result of the determination in the aforementioned S4 is affirmative (at the time point t4 in FIG. 8), namely, if shift control is performed during the performance of lockup control, S18 corresponding to the functions of the simultaneous performance control unit 120 and the lockup clutch control unit 82 is carried out. In the aforementioned S18, shift initial oil pressure delay control is started (performed). In the aforementioned S18, S71 corresponding to the function of the simultaneous performance control unit 120 is carried out as is the case with the flowchart shown in FIG. 12 described previously in the first embodiment of the disclosure. In the aforementioned S71, shift initial oil pressure control is delayed as a result of placing priority on the start of lockup initial oil pressure control. Subsequently, S72 corresponding to the function of the lockup initial oil pressure end determination unit 82c of the lockup clutch control unit 82 is carried out. In the aforementioned S72, it is determined whether or not lockup initial oil pressure control has been ended. If the result of the determination in S72 is negative, the aforementioned S71 is carried out again. If the result of the determination in S72 is affirmative (at the time point t7 in FIG. 8), S73 corresponding to the function of the simultaneous performance control unit 120 is carried out. In the aforementioned S73, shift initial oil pressure control is resumed after the lapse of the certain time tc1 (at a time point 8 in FIG. 8) since the end of lockup initial oil pressure control (at the time point t7 in FIG. 8).

If the result of the determination in the aforementioned S8 is affirmative (at the time point t12 in FIG. 10), namely, if lockup control is performed during the performance of shift control, S19 corresponding to the functions of the simultaneous performance control unit 120 and the shift initial oil pressure end determination unit 80c of the shift control unit 80 is carried out. In the aforementioned S19, lockup initial oil pressure delay control is started (performed). In the aforementioned S19, S61 corresponding to the function of the simultaneous performance control unit 120 is carried out as is the case with the flowchart shown in FIG. 11 described previously in the first embodiment of the disclosure. In the aforementioned S61, lockup initial oil pressure control is delayed as a result of placing priority on the start of shift initial oil pressure control. Subsequently, S62 corresponding to the function of the shift initial oil pressure end determination unit 80c of the shift control unit 80 is carried out. In the aforementioned S62, it is determined whether or not shift initial oil pressure control has been ended. If the result of the determination in S62 is negative, the aforementioned S61 is carried out again. If the result of the determination in S62 is affirmative (at the time point t15 in FIG. 10), S63 corresponding to the function of the simultaneous performance control unit 120 is carried out. In the aforementioned S63, lockup initial oil pressure control is resumed after the lapse of the certain time tc2 (at the time point t16 in FIG. 10) since the end of shift initial oil pressure control (at the time point t15 in FIG. 10).

Although the embodiments of the disclosure have been described above in detail based on the drawings, the disclosure is also applicable to other aspects.

For example, the simultaneous performance control unit 88 of the electronic control unit 56 or 90 according to each of the foregoing embodiments of the disclosure selects which one of lockup control and shift control should be given priority, depending on whether the running mode of the vehicle 10 is the fuel-efficient running mode or the driveability running mode. However, it may be selected which one of lockup control and shift control should be given priority depending on various operations and environments, for example, whether or not a power mode is established, whether or not a sport mode is established, whether or not the process of selecting a mode is in progress, the type of a shift (an upshift or a downshift), whether or not manual operation is performed, environments (a low temperature and a low pressure) and the like.

Besides, the simultaneous performance control unit 88 or 120 of the electronic control unit 56, 90 or 118 according to each of the foregoing embodiments of the disclosure resumes shift initial oil pressure control after the lapse of the certain time tc1 since the end of lockup initial oil pressure control, or resumes lockup initial oil pressure control after the lapse of the certain time tc2 since the end of shift initial oil pressure control. However, for example, if the oil pressure does not become insufficient, shift initial oil pressure control or lockup initial oil pressure control may be started even before the lapse of the aforementioned certain time tc1 or tc2. Besides, the aforementioned certain time tc1 or tc2 may change in accordance with, for example, changes in oil temperature or the like.

Besides, in each of the foregoing embodiments of the disclosure, the respective gear stages, namely, the eight forward stages are formed in the automatic transmission 22, but the disclosure is not limited to this aspect thereof. That is, any type of automatic transmission may be applied as the automatic transmission 22 as long as a plurality of gear stages are formed through selective engagement of one or some of a plurality of hydraulic frictional engagement devices. Besides, the engagement devices of the automatic transmission 22 may not be absolutely required to be hydraulic frictional engagement devices, but may be hydraulic engagement devices. Besides, other fluid-type transmission devices such as a fluid coupling with no torque amplification effect and the like may be employed instead of the torque converters 20 and 92.

Incidentally, the foregoing is nothing more than the embodiments of the disclosure. The disclosure can be carried out in modes subjected to various alterations and improvements based on the knowledge of those skilled in the art.

What is claimed is:

1. A control apparatus for a vehicle, the vehicle including (i) a fluid-type transmission device that includes a lockup clutch, the lockup clutch being engaged by an oil pressure, and (ii) a transmission configured to selectively constitute one of a plurality of shift stages though engagement and release by a plurality of hydraulic engagement devices, the control apparatus comprising:
an electronic control unit configured to:
perform lockup control controlling an engagement pressure of the lockup clutch, the lockup control controlling the engagement pressure of the lockup clutch to be equal to a first predetermined engagement pressure such that the lockup clutch is engaged;
perform shift control controlling engagement pressures of the plurality of hydraulic engagement devices in shifting the transmission, the shift control controlling the engagement pressures of the plurality of hydraulic engagement devices to be equal to a second predetermined engagement pressure such that at least one of the plurality of hydraulic engagement devices is engaged in shifting the transmission;

in response to the shift control being performed during performance of the lockup control, start shift initial oil pressure control after end of a lockup initial oil pressure control, the shift initial oil pressure control temporarily increasing the engagement pressures of the plurality of hydraulic engagement devices in starting the shift control such that the engagement pressures of the plurality of hydraulic engagement devices is higher than the second predetermined engagement pressure; and in response to the lockup control being performed during performance of the shift control, start the lockup initial oil pressure control after end of the shift initial oil pressure control, the lockup initial oil pressure control temporarily increasing the engagement pressure of the lockup clutch in starting the lockup control such that the engagement pressure of the lockup clutch is higher than the first predetermined engagement pressure.

2. The control apparatus according to claim 1, wherein the electronic control unit is configured to:
determine whether a fuel-efficient running mode is being performed, in which priority is placed on fuel economy, and
in response to performing the fuel-efficient running mode, prioritize the lockup initial oil pressure control and start the shift initial oil pressure control after completion of the lockup initial oil pressure control.

3. The control apparatus according to claim 1, wherein the electronic control unit is configured to:
determine whether a driveability running mode is being performed, in which priority is placed on driveability, and
in response to performing the driveability running mode, prioritize the shift initial oil pressure control and start the lockup initial oil pressure control after completion of the shift initial oil pressure control.

4. The control apparatus according to claim 1, wherein:
the shift control includes a first shift control and a second shift control,
the first shift control selects one of the plurality of the shift stages, and the second shift control selects a different one of the plurality of the shift stages that is different from the shift stage selected in the first shift control, and
the electronic control unit is configured to prioritize the first shift control and start the second shift control after completion of the first shift control, when a driveability running mode, in which priority is placed on driveability, is selected and the second shift control is performed during the first shift control.

5. The control apparatus according to claim 1, wherein:
the shift control includes a first shift control and a second shift control,
the first shift control selects one of the plurality of the shift stages, and the second shift control selects a different one of the plurality of the shift stages which is different from the shift stage selected in the first shift control, and
the electronic control unit is configured to prioritize the second shift control and end the first shift control in mid-course, when a fuel-efficient running mode, in which priority is placed on fuel economy, is selected and the second shift control is performed during the first shift control.

6. A control method for a vehicle, the vehicle including (i) a fluid-type transmission device that includes a lockup clutch, the lockup clutch being engaged by an oil pressure, (ii) a transmission configured to selectively constitute one of a plurality of shift stages through engagement and release by a plurality of hydraulic engagement devices, and (iii) an electronic control unit, the control method comprising:
performing, by the electronic control unit, lockup control controlling an engagement pressure of the lockup clutch, the lockup control controlling the engagement pressure of the lockup clutch to be equal to a first predetermined engagement pressure such that the lockup clutch is engaged;
performing, by the electronic control unit, shift control controlling engagement pressures of the plurality of hydraulic engagement devices in shifting the transmission, the shift control controlling the engagement pressures of the plurality of hydraulic engagement devices to be equal to a second predetermined engagement pressure such that at least one of the plurality of hydraulic engagement devices is engaged in shifting the transmission;
in response to the shift control being performed during performance of the lockup control, starting, by the electronic control unit, shift initial oil pressure control after end of a lockup initial oil pressure control, the shift initial oil pressure control temporarily increasing the engagement pressures of the plurality of hydraulic engagement devices in starting the shift control such that the engagement pressures of the plurality of hydraulic engagement devices is higher than the second predetermined engagement pressure; and
in response to the lockup control being performed during performance of the shift control, starting, by the electronic control unit, the lockup initial oil pressure control after end of the shift initial oil pressure control, the lockup initial oil pressure control temporarily increasing the engagement pressure of the lockup clutch in starting the lockup control such that the engagement pressure of the lockup clutch is higher than the first predetermined engagement pressure.

7. The control method according to claim 6, further comprising determining, by the electronic control unit, whether a fuel-efficient running mode is being performed, in which priority is placed on fuel economy, wherein
priority is placed on the lockup initial oil pressure control and the shift initial oil pressure control is started after completion of the lockup initial oil pressure control, by the electronic control unit, when the fuel-efficient running mode is being performed.

8. The control method according to claim 6, further comprising determining, by the electronic control unit, whether a driveability running mode is being performed, in which priority is placed on driveability, wherein
priority is placed on the shift initial oil pressure control and the lockup initial oil pressure control is started after completion of the shift initial oil pressure control, by the electronic control unit, when the driveability running mode is being performed.

9. The control method according to claim 6, wherein:
the shift control includes a first shift control and a second shift control,
priority is placed on the first shift control and the second shift control is started after completion of first shift control, by the electronic control unit, when a driveability running mode, in which priority is placed on driveability, is selected and the second shift control is performed during the first shift control, and the first shift control selects one of the plurality of the shift stages in the shift control, and the second shift control selects a different one of the plurality of the shift stages that is different from the shift stage selected in the first shift control.

10. The control method according to claim 6, wherein:

the shift control includes a first shift control and a second shift control, priority is placed on the second shift control and the first shift control is ended in mid-course, by the electronic control unit, when a fuel-efficient running mode, in which priority is placed on fuel economy, is selected and the second shift control is performed during the first shift control, and the first shift control selects one of the plurality of the shift stages in the shift control, and the second shift control selects a different one of the plurality of the shift stages that is different from the shift stage selected in the first shift control.

\* \* \* \* \*